US008633807B2

(12) United States Patent
Sano

(10) Patent No.: US 8,633,807 B2
(45) Date of Patent: Jan. 21, 2014

(54) RF TAG READER AND WRITER

(75) Inventor: Kouichi Sano, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 415 days.

(21) Appl. No.: 13/025,386

(22) Filed: Feb. 11, 2011

(65) Prior Publication Data
US 2011/0199193 A1 Aug. 18, 2011

(30) Foreign Application Priority Data

Feb. 12, 2010 (JP) .................................. 2010-29450

(51) Int. Cl.
H04Q 5/22 (2006.01)
G05B 23/02 (2006.01)
G08B 13/14 (2006.01)
H04B 7/212 (2006.01)
H04L 12/413 (2006.01)
H04W 4/00 (2009.01)
G06F 17/00 (2006.01)
G06F 19/00 (2011.01)
H04W 40/00 (2009.01)

(52) U.S. Cl.
USPC ..... 340/10.51; 340/10.1; 340/10.2; 340/10.6; 340/3.41; 340/572.9; 370/348; 370/445; 370/330; 235/375; 235/385; 455/447

(58) Field of Classification Search
USPC ............................................. 340/10.1–10.6
See application file for complete search history.

(56) References Cited

U.S. PATENT DOCUMENTS

| 4,899,389 | A | * | 2/1990 | Amazawa | ..................... 381/94.8 |
| 7,295,117 | B2 | * | 11/2007 | Forster et al. | ............... 340/572.1 |
| 7,420,468 | B2 | * | 9/2008 | Fabian et al. | ............... 340/572.1 |
| 7,511,601 | B2 | * | 3/2009 | Eisenberg et al. | ........... 340/3.51 |
| 7,650,114 | B2 | * | 1/2010 | Tsirline et al. | ................ 455/41.2 |
| 2006/0022058 | A1 | * | 2/2006 | Akiyama et al. | ............... 235/492 |
| 2007/0080788 | A1 | * | 4/2007 | Manley et al. | ............. 340/10.33 |
| 2007/0126555 | A1 | * | 6/2007 | Bandy | ........................... 340/10.2 |
| 2007/0286227 | A1 | * | 12/2007 | Koezuka | ....................... 370/445 |
| 2008/0030335 | A1 | * | 2/2008 | Nishida et al. | .............. 340/572.1 |
| 2008/0074238 | A1 | * | 3/2008 | Kodialam et al. | ............ 340/10.2 |
| 2008/0088453 | A1 | * | 4/2008 | Kiji et al. | .................... 340/572.1 |
| 2008/0106383 | A1 | * | 5/2008 | Choi et al. | ................... 340/10.2 |
| 2008/0150674 | A1 | * | 6/2008 | Park et al. | .................... 340/3.41 |

(Continued)

FOREIGN PATENT DOCUMENTS

JP 2008-124849 5/2008
JP 2008-278083 11/2008

Primary Examiner — Daniel Wu
Assistant Examiner — Muhammad Adnan
(74) Attorney, Agent, or Firm — Turocy & Watson, LLP

(57) ABSTRACT

An RF tag reader and writer is provided which includes: a communication unit that communicates with one or more RF tags as an information acquisition target using an anti-collision method of avoiding a collision between signals and that performs an acquisition process of acquiring tag information which is information stored in the one or more RF tags; and a communication success rate calculator that calculates a communication success rate of the communication unit with the one or more RF tags on the basis of the number of times by which the communication unit successfully acquires the tag information from the one or more RF tags within a predetermined period and the number of times by which the communication unit performs a communication process with the one or more RF tags in a state where the collision between signals is avoided within the predetermined period.

8 Claims, 24 Drawing Sheets

(56) References Cited

U.S. PATENT DOCUMENTS

| | | | |
|---|---|---|---|
| 2008/0150692 A1* | 6/2008 | Missimer et al. | 340/10.1 |
| 2008/0180222 A1* | 7/2008 | Hollister et al. | 340/10.3 |
| 2009/0134975 A1* | 5/2009 | Eom et al. | 340/10.2 |
| 2009/0146785 A1* | 6/2009 | Forster | 340/10.1 |
| 2010/0026462 A1* | 2/2010 | Lim et al. | 340/10.1 |
| 2010/0109847 A1* | 5/2010 | Noel et al. | 340/10.2 |
| 2010/0171595 A1 | 7/2010 | Fujino et al. | |

* cited by examiner

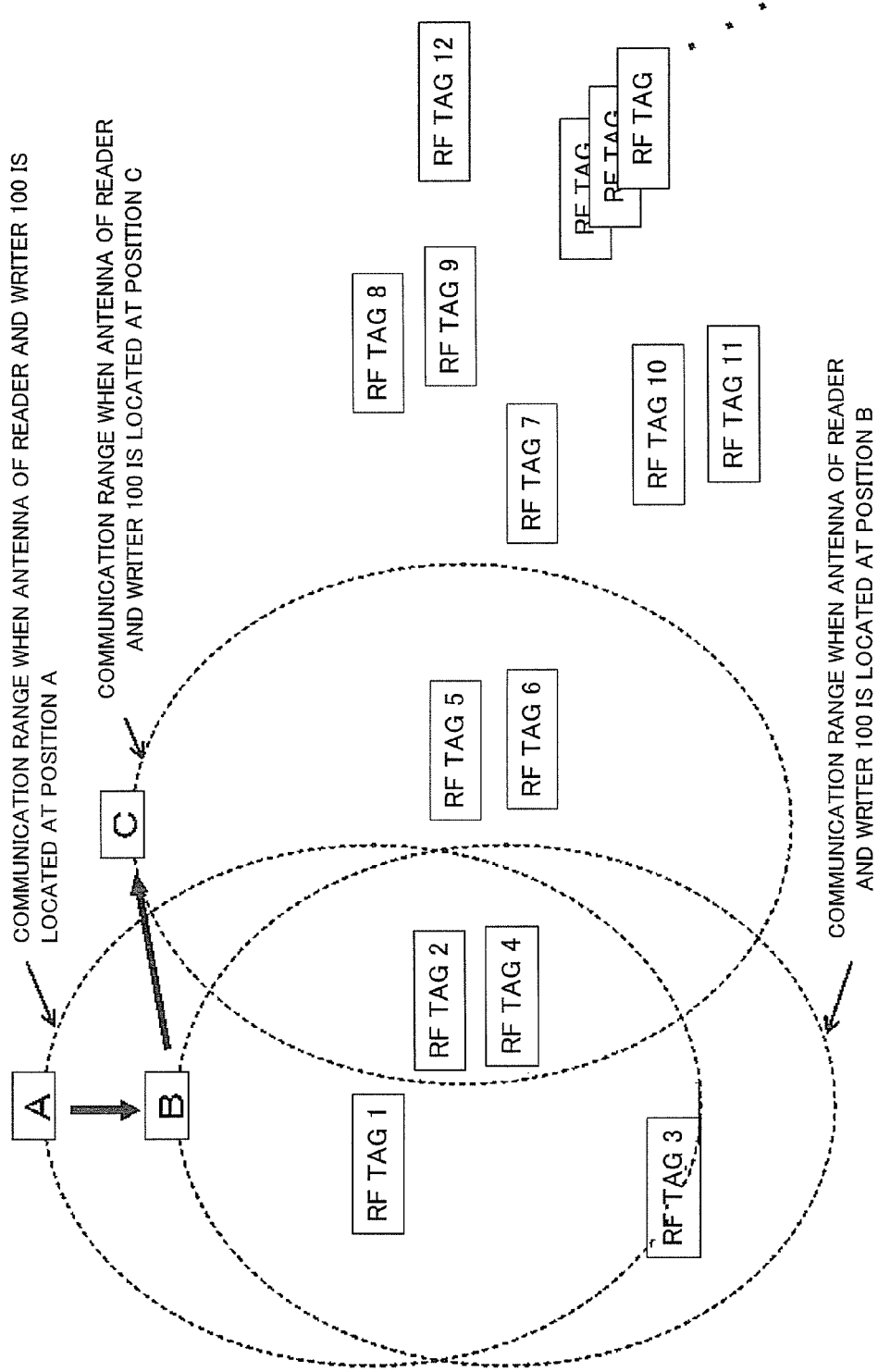

FIG.8

| COMMUNICATION RATE $a_{ACK0}$ | COMMUNICATION SUCCESS RATE $a_{ID}$ | DETERMINATION DETAILS | NOTIFICATION DETAILS TO DISPLAY UNIT |
|---|---|---|---|
| 0 | — | IT IS DETERMINED THAT NO RF TAG EXISTS AROUND OR READING IS FINISHED. (DETERMINATION RESULT 1) | NO RF TAG RESPONDS. NO RF TAG EXISTS AROUND OR READING IS FINISHED. PLEASE MOVE TO READ NEW RF TAG. |
| GREATER THAN 0 | LESS THAN REFERENCE | IT IS DETERMINED THAT RF TAG RESPONDING (TO BE READ) EXISTS BUT COMMUNICATION STATE IS NOT GOOD. (DETERMINATION RESULT 2) | PLEASE BRING ANTENNA OF RF TAG COMMUNICATION DEVICE CLOSER TO RF TAG, BECAUSE RF TAG RESPONDING EXISTS BUT COMMUNICATION STATE IS NOT GOOD. |
| GREATER THAN 0 | EQUAL TO OR GREATER THAN REFERENCE | IT IS DETERMINED THAT RF TAG RESPONDING (TO BE READ) EXISTS AND COMMUNICATION STATE IS GOOD. (DETERMINATION RESULT 3) | PLEASE STOP ANTENNA OF RF TAG COMMUNICATION DEVICE, BECAUSE RF TAG RESPONDING EXISTS AND COMMUNICATION STATE IS GOOD. |

FIG.9

| ROUND | COMMUNICATION RATE | COMMUNICATION SUCCESS RATE | DETERMINATION RESULT |
|---|---|---|---|
| ROUND 1 | 0.5 | 1 | DETERMINATION RESULT 3 |
| ROUND 2 | 0.5 | 0.5 | DETERMINATION RESULT 2 |
| ROUND 3 | 0.25 | 1 | DETERMINATION RESULT 3 |
| ROUND 4 | 0 | 0 | DETERMINATION RESULT 1 |

FIG.10

| GROUPING ORDER | GROUP OF IDENTIFICATION ID |
|---|---|
| 1 | 1511(IDENTIFICATION ID OF RF TAG 1)<br>1512(IDENTIFICATION ID OF RF TAG 2)<br>1514(IDENTIFICATION ID OF RF TAG 4) |
| 2 | 1513(IDENTIFICATION ID OF RF TAG 3) |
| 3 | 1515(IDENTIFICATION ID OF RF TAG 5)<br>1516(IDENTIFICATION ID OF RF TAG 6) |

FIG.12

PLEASE SELECT WORK TO BE PERFORMED

1. INVENTORY ARRANGEMENT (BATCH READING PROCESS)

2. READING FROM SPECIFIC RF TAG (SELECTIVE READING PROCESS)

3. ISSUING RF TAG (SELECTIVE WRITING PROCESS)

FIG.17

| RECEIVED SIGNAL LEVEL | DETERMINATION DETAILS |
|---|---|
| LESS THAN REFERENCE | NO RESPONSE |
| EQUAL TO OR GREATER THAN REFERENCE | RESPONSE |

FIG.19

| RESPONSE RATE $a_{RN16}$ | COMMUNICATION RATE $a_{ACK0}$ | COMMUNICATION SUCCESS RATE $a_{ID}$ | DETERMINATION DETAILS | NOTIFICATION DETAILS TO DISPLAY UNIT |
|---|---|---|---|---|
| 0 | 0 | — | IT IS DETERMINED THAT NO RF TAG EXISTS AROUND OR READING IS FINISHED. (DETERMINATION RESULT 1) | NO RF TAG RESPONDING. NO RF TAG EXISTS AROUND OR READING IS FINISHED. PLEASE MOVE TO READ NEW RF TAG. |
| GREATER THAN 0 | 0 | — | IT IS DETERMINED THAT RF TAG RESPONDING (TO BE READ) EXISTS BUT COLLISION IS GENERATED. (DETERMINATION RESULT 4) | PLEASE SET SLOT NUMBER TO BE GREATER, BECAUSE COLLISION IS GENERATED. |
| GREATER THAN 0 | GREATER THAN 0 | LESS THAN REFERENCE | IT IS DETERMINED THAT RF TAG RESPONDING (TO BE READ) EXISTS BUT COMMUNICATION STATE IS NOT GOOD. (DETERMINATION RESULT 2) | PLEASE BRING ANTENNA OF RF TAG COMMUNICATION DEVICE CLOSER TO RF TAG, BECAUSE RF TAG RESPONDING EXISTS BUT COMMUNICATION STATE IS NOT GOOD. |
| GREATER THAN 0 | GREATER THAN 0 | EQUAL TO OR GREATER THAN REFERENCE | IT IS DETERMINED THAT RF TAG RESPONDING (TO BE READ) EXISTS AND COMMUNICATION STATE IS GOOD. (DETERMINATION RESULT 3) | PLEASE STOP ANTENNA OF RF TAG COMMUNICATION DEVICE, BECAUSE RF TAG RESPONDING EXISTS AND COMMUNICATION STATE IS GOOD. |

FIG.20

| ROUND | RESPONSE RATE | COMMUNICATION RATE | COMMUNICATION SUCCESS RATE | DETERMINATION RESULT |
|---|---|---|---|---|
| ROUND 1 | 0.75 | 0.5 | 1 | DETERMINATION RESULT 3 |
| ROUND 2 | 0.5 | 0.5 | 0.5 | DETERMINATION RESULT 2 |
| ROUND 3 | 0.33 | 0.25 | 1 | DETERMINATION RESULT 3 |
| ROUND 4 | 0 | 0 | 0 | DETERMINATION RESULT 1 |

FIG.24

| COMMUNICATION SUCCESS RATE $a_{ID}$ | DETERMINATION DETAILS | NOTIFICATION DETAILS TO DISPLAY UNIT |
|---|---|---|
| 0 | IT IS DETERMINED THAT COMMUNICATION STATE IS NOT GOOD OR NO RF TAG RESPONDING (TO BE READ) EXISTS. | PLEASE BRING ANTENNA CLOSER TO RF TAG OR MOVE ANTENNA, BECAUSE COMMUNICATION STATE IS NOT GOOD OR NO RF TAG RESPONDING EXISTS. |
| $0 < a_{ID} <$ REFERENCE | IT IS DETERMINED THAT COMMUNICATION STATE IS NOT GOOD. | PLEASE BRING ANTENNA OF RF TAG COMMUNICATION DEVICE CLOSER TO RF TAG, BECAUSE COMMUNICATION STATE IS NOT GOOD. |
| EQUAL TO OR GREATER THAN REFERENCE | IT IS DETERMINED THAT RF TAG RESPONDING (TO BE READ) EXISTS AND COMMUNICATION STATE IS GOOD. | PLEASE STOP ANTENNA OF RF TAG COMMUNICATION DEVICE, BECAUSE RF TAG RESPONDING EXISTS AND COMMUNICATION STATE IS GOOD. |

RF TAG READER AND WRITER

CROSS-REFERENCE TO RELATED APPLICATION

This application is based upon and claims the benefit of priority from Japanese Patent Application No. 2010-29450, filed on Feb. 12, 2010; the entire contents of which are incorporated herein by reference.

FIELD

The embodiments described in this specification relate to a tag information acquiring technique of acquiring (reading) information stored in RF tags by communications with the RF tags.

BACKGROUND

In recent years, an RFID (Radio Frequency Identification) system attracts attention and is introduced into, for example, a field of distributions. The RFID system includes an RF tag (also referred to as an "RFID tag") including an IC chip and an antenna and being attached to a commodity and an RF tag reader and writer (hereinafter, simply also referred to as "reader and writer") reading information stored in a memory in the IC chip of the RF tag in a contactless manner and writing information to the memory in the IC chip of the RF tag in a contactless manner.

An exemplary process in the RFID system is a batch information reading process (hereinafter, also referred to as "batch reading") from plural RF tags in an inventory arrangement in a store. At this time, the reader and writer radiates electric waves over a range of several m and communicates with unspecified RF tags attached to plural commodities, whereby information stored in the RF tags is read all at once. Here, the RF tags as reading targets are generally arranged in a range spatially wider than a reading range of an antenna of the reader and writer. Accordingly, in the inventory arrangement, the information is acquired from the RF tags while moving the antenna of the reader and writer and changing a communication range.

Here, in the reader and writer according to the related art, a buzzer sounds when information can be acquired from an RF tag. A user can confirm whether the acquiring of information is successful depending on whether the buzzer sounds or not. Accordingly, in the inventory arrangement, the user goes around in a range of the inventory arrangement while checking whether the buzzer sounds and thus acquires information from the RF tags. Thereafter, the acquired information is compared with information which is stored in advance in a memory area of a server or the reader and writer and which is the same as the information stored in the RF tag in use (in a state where it is attached to a commodity), whereby it is checked whether any reading omission exists.

However, it is difficult for the user to accurately see the communication state or the reading omission only through the buzzer indicating that the reading is successful.

DESCRIPTION OF THE DRAWINGS

FIG. 7 is a diagram illustrating exemplary movement of the RF tag reader and writer according to the first embodiment.

FIG. 8 is a diagram illustrating an example of communication stability reference information according to the first embodiment.

FIG. 9 is a diagram illustrating an example of a communication state determination result stored in a memory unit according to the first embodiment.

FIG. 10 is a diagram illustrating an example of identification IDs grouped and stored according to the first embodiment.

FIG. 12 is a diagram illustrating an example of a process start picture according to the first embodiment.

FIG. 17 is a diagram illustrating an example of signal level reference information according to the second embodiment.

FIG. 19 is a diagram illustrating an example of communication stability reference information according to the second embodiment.

FIG. 20 is a diagram illustrating an example of a communication state determination result stored in a memory unit according to the second embodiment.

FIG. 24 is a diagram illustrating an example of communication stability reference information according to another embodiment of the invention.

DETAILED DESCRIPTION

An RF tag reader and writer according to an embodiment of the invention is an RF tag reader including a reading omission determining unit that determines that there is a possibility of a reading omission of an RF tag belonging to a group when tag information is not acquired from the RF tag which belongs to the group and of which the tag information is not acquired, within a predetermined time after acquiring tag information corresponding to one of plural RF tags grouped into a predetermined group.

First Embodiment

Hereinafter, a first embodiment of the invention will be described with reference to the accompanying drawings. In the following description an identification ID (tag ID) is exemplified as information stored in an RF tag. For the purpose of easy understanding, it is assumed that a calculation period of a communication success rate is set to a round.

Figure 1:
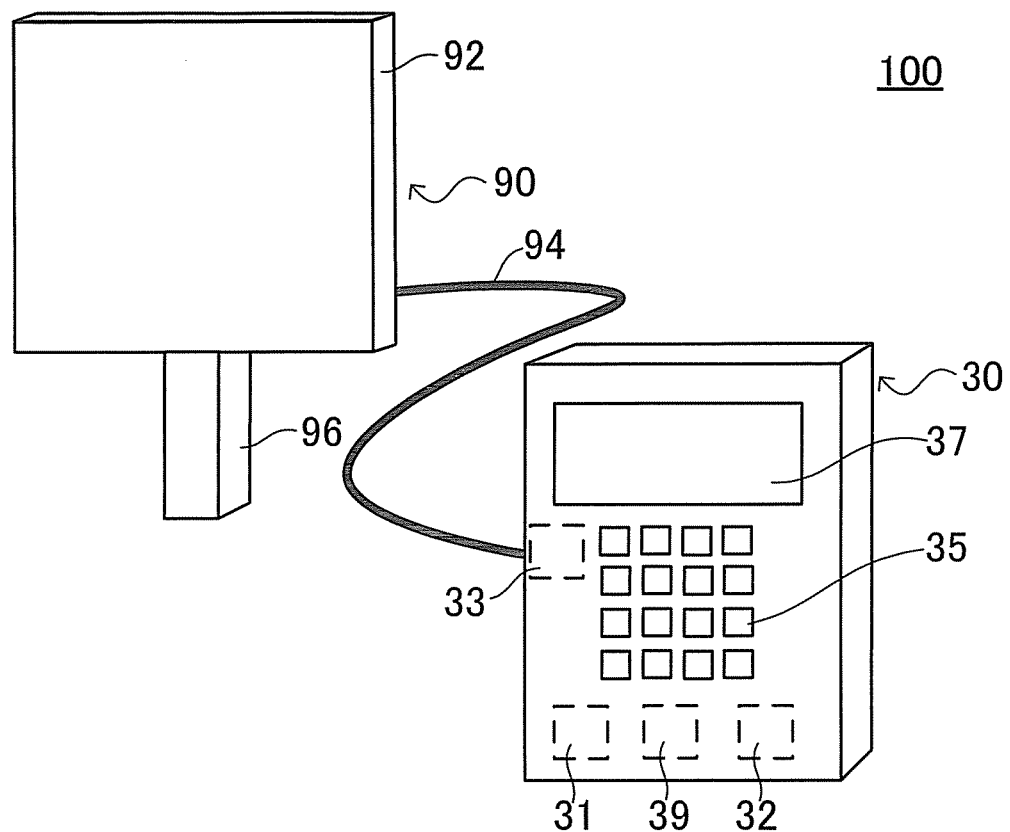
FIG. 1 is a perspective view illustrating an RF tag reader and writer according to a first embodiment of the invention.

FIG. 1 is a perspective view illustrating an RF tag reader and writer 100 according to the first embodiment of the invention. The reader and writer 100 according to the first embodiment includes an antenna device 90 having an antenna (not shown) built in a chassis 92 and a reader and writer body 30. The antenna device 90 and the reader and writer body 30 are connected to each other via a coaxial cable 94.

The antenna disposed in the antenna device 90 is not particularly limited and may be, for example, a patch antenna. The reader and writer 100 communicates with an RF tag (not shown) using electric waves radiated from the antenna. In the first embodiment, a grip member 96 is disposed in the chassis 92, whereby a user can easily hold and carry the antenna device 90 when using the reader and writer 100. However, the grip member 96 may not be provided.

Figure 2:
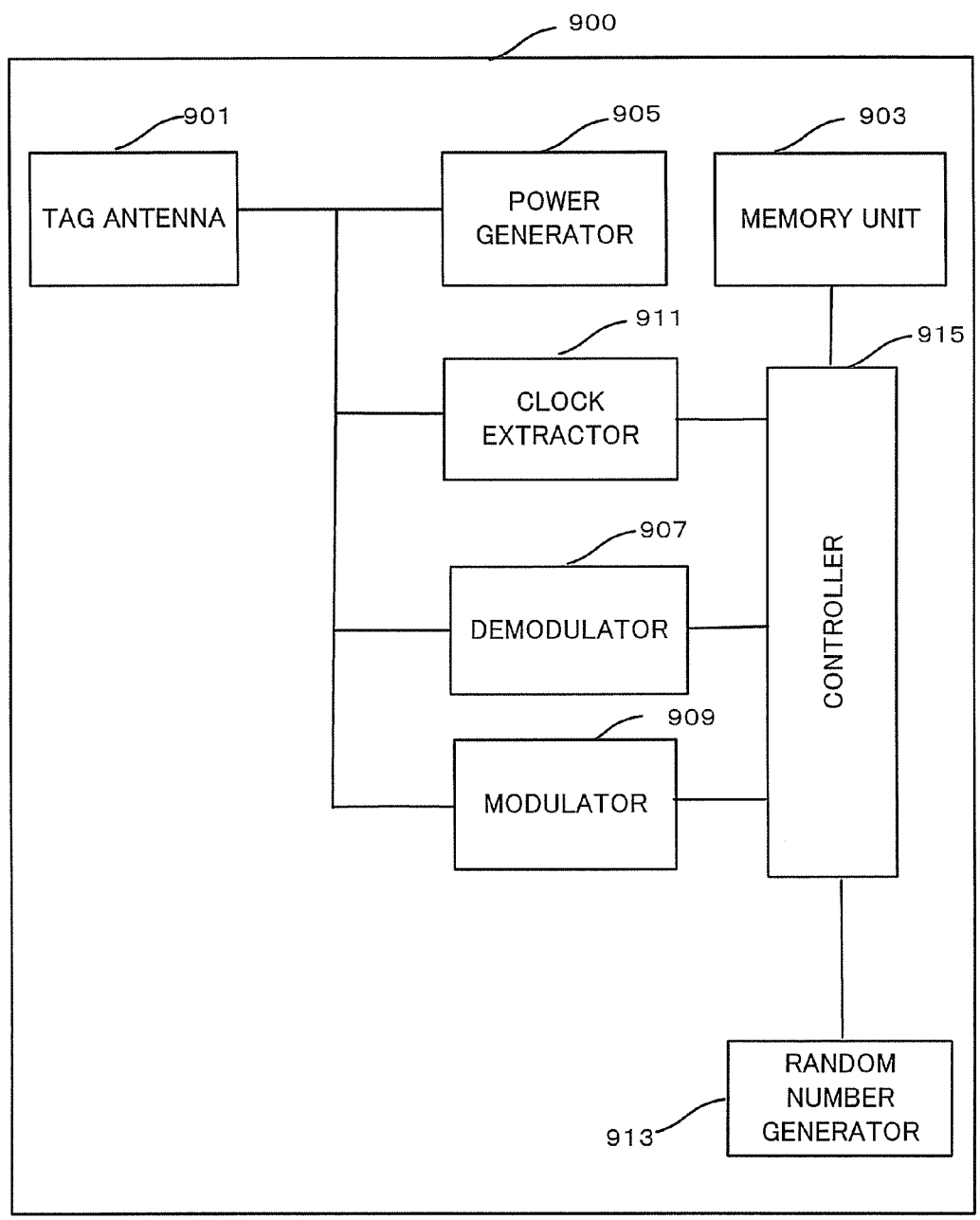
FIG. 2 is a block diagram illustrating the hardware structure of an RF tag according to the first embodiment.

FIG. 2 is a functional block diagram illustrating an RF tag. The RF tag is attached to a commodity or a delivery, is a type of RF data carrier, and is an independent component in which a tag antenna capable of transmitting and receiving data and an IC chip are monolithically formed in a substrate. An IC chip 900 includes a memory 903 that stores a predetermined information signal (tag information), a power generator 905 that supplies power to units of the IC chip 900 by rectifying and stabilizing modulated electric waves received by a tag antenna 901, a demodulator 907 that demodulates and sends the modulated electric waves (demodulates a communication signal) to a controller 915, a modulator 909 that modulates data sent from the controller 915 and sends the modulated data (modulates a response signal) to the tag antenna 901, a clock extractor 911 that extracts a clock signal from the modulated electric waves received by the tag antenna 901 and supplies the extracted clock signal to the controller 915, a random number generator 913 that generates a random number of 0 to $2^{Q-1}$ on the basis of a designated slot number value Q which is used to determine which identification slot the RF tag should output a response signal and which is designated by the modulated electric waves when receiving the modulated electric waves from the reader and writer 100, and the controller 915 that controls the operation of the RF tag by the use of the memory 903, the demodulator 907, the modulator 909, the clock extractor 911, and the random number generator 913.

Figure 3:
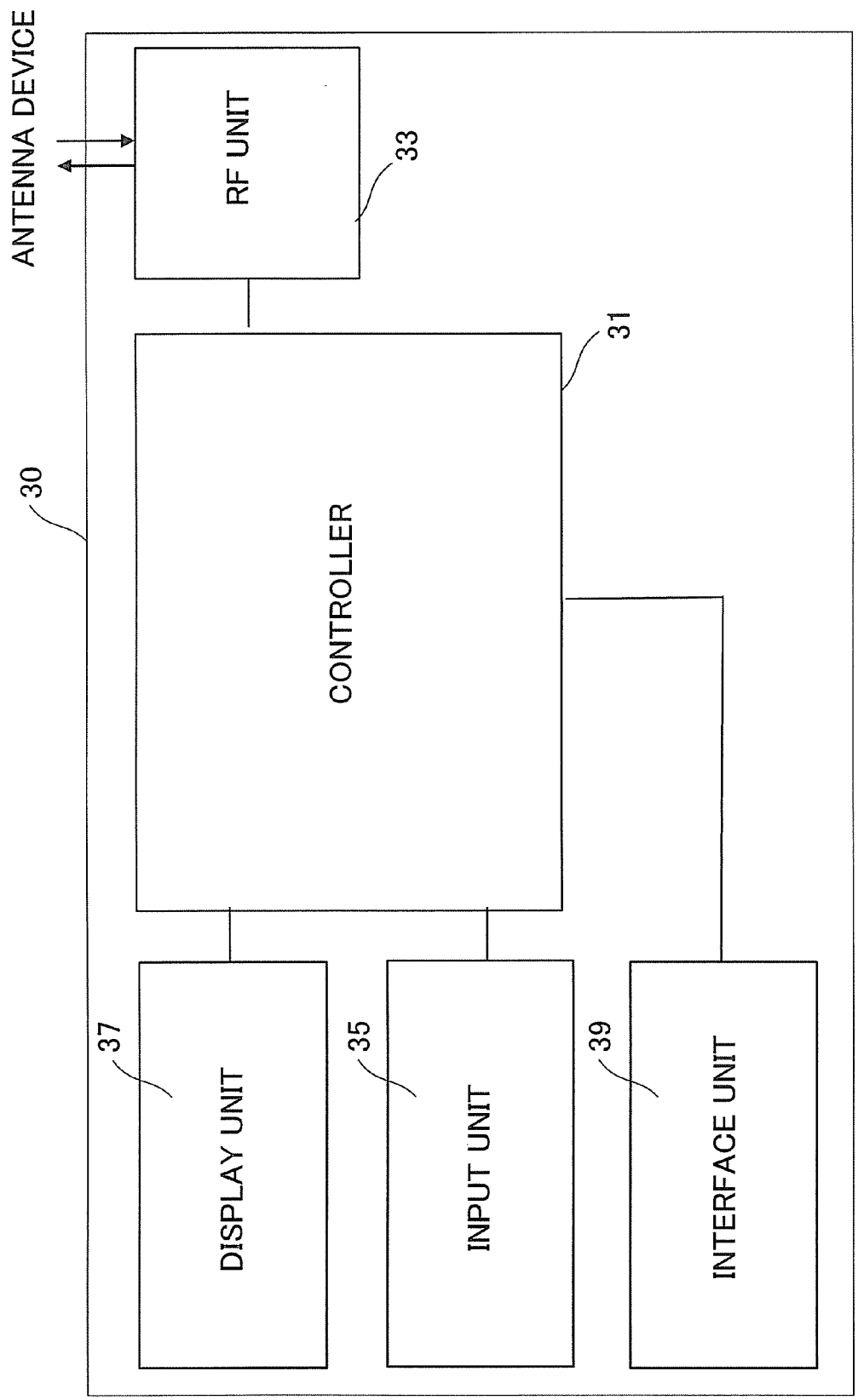
FIG. 3 is a block diagram illustrating the hardware structure of the RF tag reader and writer according to the first embodiment.

The hardware configuration of the reader and writer body 30 will be described below. As shown in FIG. 3, the reader and writer body 30 includes a controller 31, an RF unit 33, an input unit 35, a display unit 37, and an interface unit 39. Current is supplied to the hardware components and the antenna device 90 by a battery and a power source unit 32 which is shown in FIG. 1 and which controls charging and discharging of the battery. Therefore, the reader and writer 100 according to the first embodiment serves as a portable reader and writer.

The controller 31 serves to perform various processes in the reader and writer 100, such as communication with an RF tag and communication with an external device such as a PC (personal computer) (not shown) via a network, by executing a program stored in a memory unit 311 to be described later on the basis of an input from a user. For example, the controller controls the RF unit 33 in accordance with communication protocols so as to transmit an identification ID, which is acquired from the PC via the interface unit 39 to be described later or input from the user via the input unit 35 to be described later, as electric waves to the RF tag from the antenna device 90. On the basis of power information stored in the memory unit 311 to be described later, the controller 31 also controls the RF unit 33 to be described later to radiate the electric waves from the antenna device 90 with transmission power indicated by the power information.

Figure 4:
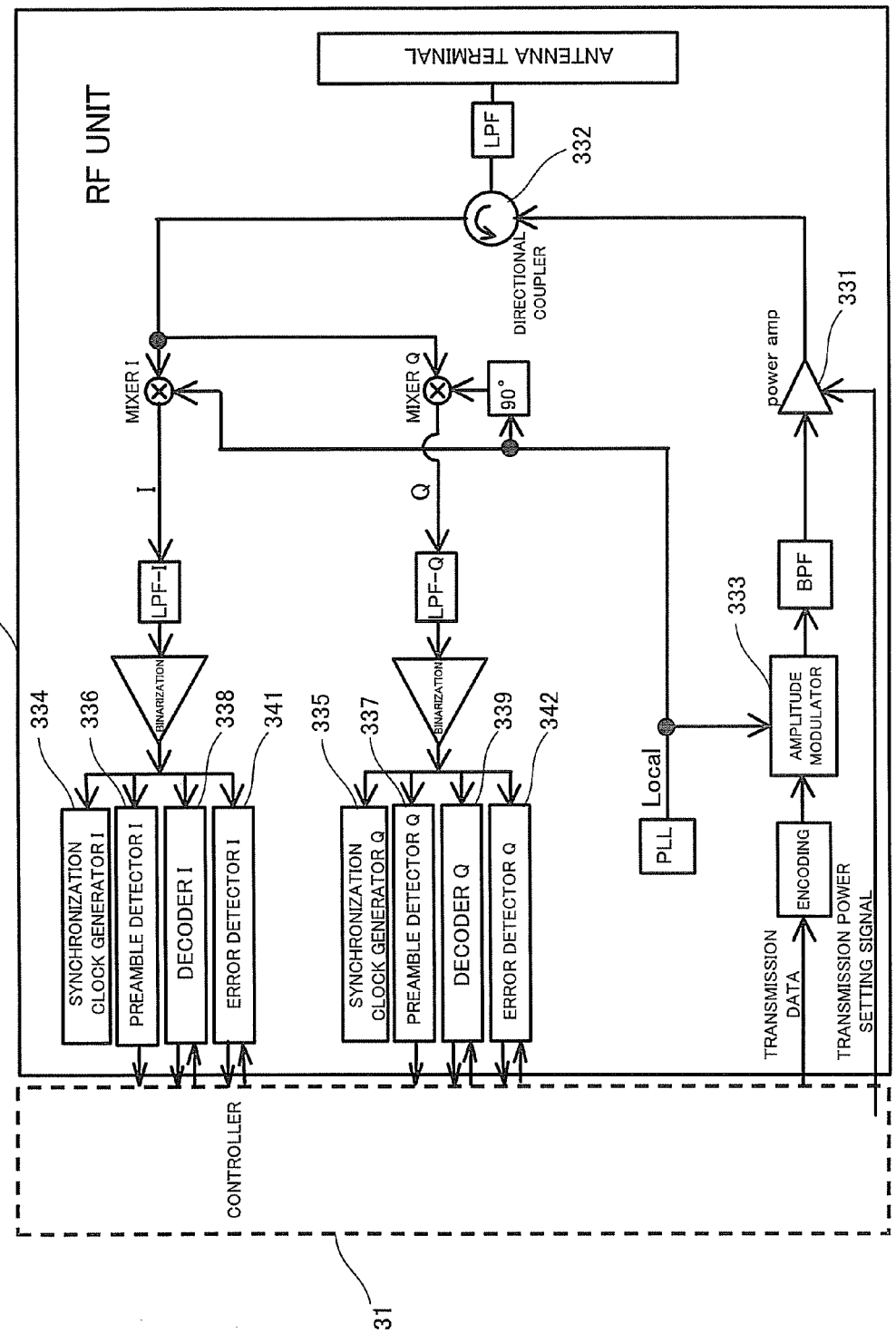
FIG. 4 is a functional block diagram illustrating a communication success rate calculating process and a communication state determining process in the RF tag reader and writer according to the first embodiment.

The RF unit 33 is a hardware component having a function of communicating with an RF tag via the antenna device 90. The detailed circuit diagram of the RF unit 33 is shown in FIG. 4.

Here, when an RF tag is a passive tag not having a battery, the RF unit 33 first amplifies an unmodulated carrier by the use of a power amplifier 331, outputs electromagnetic waves from the antenna via a directional coupler 332, and thus starts up the RF tag. When data is transmitted to the RF tag, data is transmitted by modulating an amplitude of a signal encoded in accordance with the communication protocols by the use of an amplitude modulator 333, amplifying the power by the use of the power amplifier 331, and outputting electromagnetic waves from the antenna via the directional coupler 332. When a signal is received from the RF tag, the RF tag controls (back-scatters) an impedance of an antenna terminal in a state where an unmodulated carrier is being transmitted from the reader and writer 100, whereby the reflection state is changed and the change is detected by the antenna device of the reader and writer 100. The received electromagnetic wave signal is orthogonally demodulated by the directional coupler 332, a synchronization clock is generated by synchronization clock generators I (334) and Q (335), a head of data is detected by allowing preamble detectors I (336) and Q (337) to detect a predetermined preamble, and the data is decoded by decoders I (338) and Q (339), whereby the received data is obtained. Error detectors I (341) and Q (342) detect an error using an error detection code. In FIG. 3, when there is no error in any of the demodulation of an in-phase component and the demodulation of an orthogonal component in the orthogonal demodulation, it is determined that the data is received correctly. By the control of a transmission power controller of the controller 31 (specifically, by transmitting a transmission power setting signal for setting the transmission power), the transmission power can be set by the power amplifier 331 depending on the process type.

The input unit 35 is a hardware component allowing a user to input an instruction to the reader and writer 100 by the use of the input unit 35, and specifically includes buttons (keys) or a touch pad capable of inputting the instruction by pressing them.

The display unit (display) 37 is a hardware component used to display a communication result with the RF tag for the user or to prompt the user to input an instruction, and specifically includes an LCD (Liquid Crystal Display). By constructing the display unit 37 as a graphical display mounted with a touch panel sensor, the input unit 35 and the display unit 37 may be formed in a single body.

The interface unit 39 is a hardware component that communicates with an external device such as a PC storing identification IDs via a network.

Figure 5:
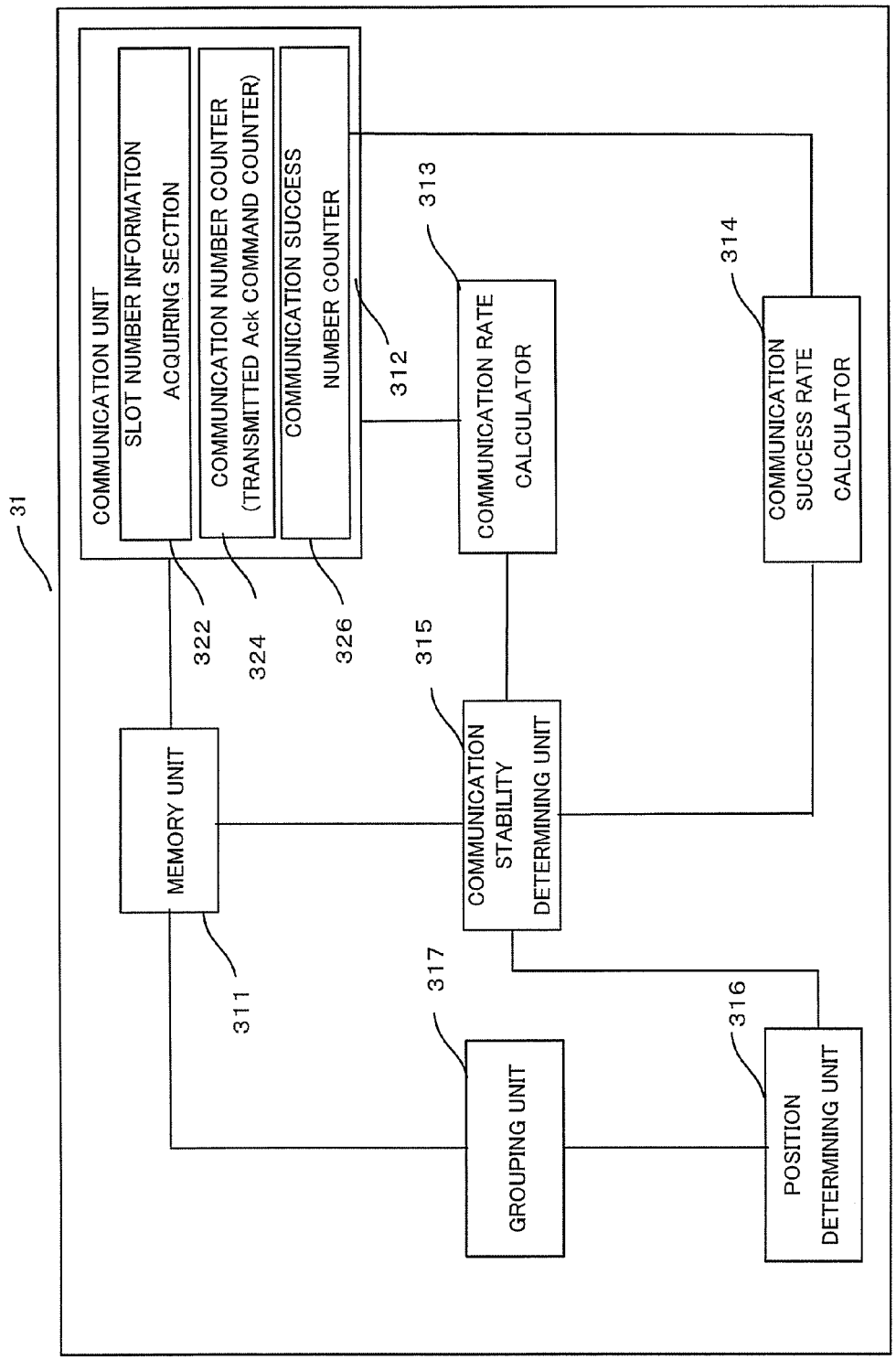
FIG. 5 is a circuit diagram illustrating a controller of the RF tag reader and writer according to the first embodiment.

The functional blocks of the controller 31 will be described below. As shown in FIG. 5, the controller 31 includes the memory unit 311, a communication unit 312, a communication rate calculator 313, a communication success rate calculator 314, a communication stability determining unit 315, a position determining unit 316, and a grouping unit 317.

The memory unit 311 stores acquired identification IDs or communication protocols (for example, communication protocol of an RF tag based on ISO 18000-6 type C) for transmitting the identification IDs using electric waves. In the first embodiment, the memory unit 311 also stores communication success rate reference information which is a reference for a communication success rate used for the determination of a communication state by the communication stability determining unit 315 to be described later. In the first embodiment, a communication rate or a communication success rate calculated for every round is stored therein (details of which will be described later).

The communication unit 312 controls the RF unit 33 to perform a communication with an RF tag using a slot aloha method of performing a communication process with an RF tag in plural time slots (hereinafter, simply referred to as "slots") of a round. More specifically, the communication unit 312 in the first embodiment performs a communication process in accordance with the protocol of ISO 18000-6 type C.

Figure 6:
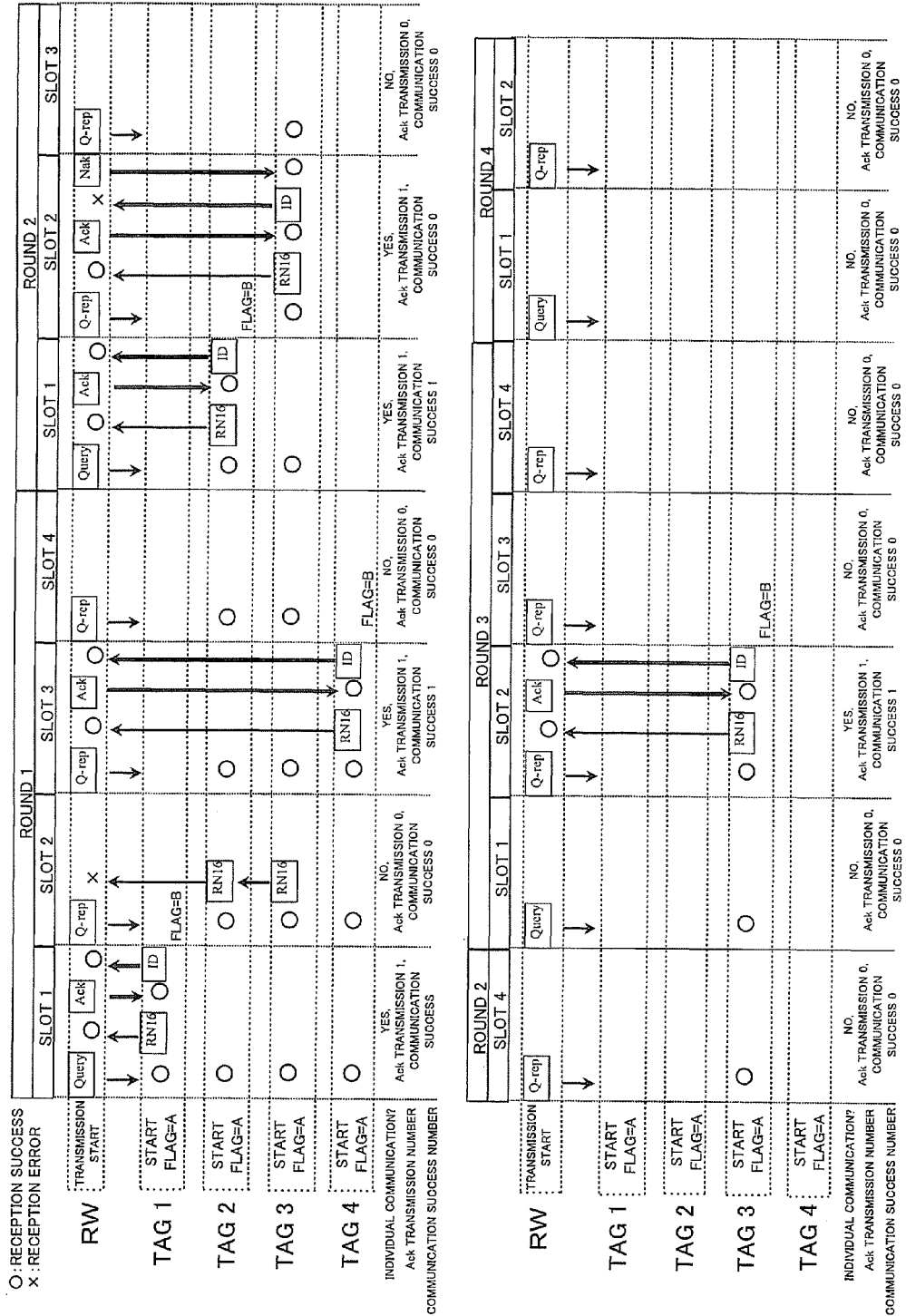
FIG. 6 is an examplary timing diagram illustrating a communication process based on ISO 18000-6 type C according to the first embodiment.

The communication process of the communication unit 312 with an RF tag will be described in more detail. FIG. 6 is a timing diagram illustrating the operation of the reader and writer 100 according to this embodiment. FIG. 7 is a diagram illustrating a relationship among a position and a communication range of the antenna device 90 of the reader and writer 100 according to this embodiment and positions of RF tags. Here, the communication range in FIG. 7 means a range in which it can accurately communicate with an RF tag when the RF tag is completely placed in the range and no collision is generated.

In the description of the first embodiment, it is assumed that four RF tags 1 to 4 exist as the RF tag and the number of slots per round is 4 ($=2^Q=2^2$) on the basis of the protocol of ISO 18000-6 type C. Out of a Query command, a Query-Rep command, a Query-adjust command, an RN16 transmission (RN16 response), an Ack command, and an ID transmission (ID return) based on the ISO 18000-6 type C and shown in FIG. 6, an error can more easily occur in the RN16 transmission and the ID transmission to be transmitted from the RF tags than in the Query command, the Query-Rep command, the Query-adjust command, and the Ack command transmitted to the RF tags from the communication unit 312 (that is, the reader and writer 100) because the RN16 transmission and the ID transmission are transmitted in a back-scattering manner. Since the amount of data in the ID transmission is generally greater than that in the RN16 transmission, an error more easily occurs in the ID transmission in the state where there is no collision between the RF tags.

First, it is assumed that the antenna device 90 of the reader and writer 100 is located at a position A in rounds 1 and 2 and located at a position B in rounds 3 and 4. When the antenna device 90 is located at the position A, it is assumed that RF tag 1, RF tag 2, and RF tag 4 are within the communication range of the reader and writer 100 and RF tag 3 is placed at a boundary of the communication range.

In FIG. 6, first, the communication unit 312 of the reader and writer 100 starts transmitting electromagnetic waves. Since the electromagnetic waves are transmitted only to supply power to the RF tags, unmodulated carriers are transmitted. RF tags 1 to 4 are started up with the reception of the electromagnetic waves. Each RF tag communicating on the basis of the protocol of ISO 18000-6 type C has a flag (an inventoried flag) and the flag when each RF tag is started up is set to A.

The communication unit 312 transmits a Query command which is a response request command for requesting unspecified RF tags for responses. The Query command includes at least a parameter indicating that the number of slots per round is 4 and a parameter indicating that the RF tag having a flag of A is a target. RF tags 1 to 4 generate a random number and determine at what slot out of four slots of one round to respond, when receiving the Query command. Each RF tag also generates data RN16 (corresponding to a response) when responding thereto. The slot and the RN16 for response are determined depending on the random number generated by each RF tag, and particularly a value of the RN16 varies depending on the RF tags. In FIG. 6, it is assumed that RF tag 1 responds at slot 1, RF tag 2 and RF tag 3 respond at slot 2, and RF tag 4 responds at slot 3.

In accordance with the ISO 18000-6 type C, only RF tag 1 returns the RN16 at slot 1. Since there is no collision, the communication unit 312 correctly receives the RN16 transmitted from RF tag 1. Then, the communication unit 312 transmits an Ack command (corresponding to a tag information request command) including the received RN16. When receiving the Ack command, the RF tag 1 checks whether the RN16 transmitted from itself is included in the Ack command and determines that the Ack command is transmitted to itself when the RN16 is included in the Ack command. In this case, RF tag 1 is a destination, RF tag 1 returns an identification ID to the communication unit 312, and the communication unit 312 correctly receives the returned identification ID.

Then, the communication unit 312 transmits a Q-rep (Query-Rep) command and goes to the next slot (slot 2). The Query-Rep command includes at least a parameter indicating the flag (A) as described above. Here, RF tag 1 having transmitted the identification ID at slot 1 changes the flag to B and stops its response. RF tags 2 to 4 receive the Query-Rep command and acquire information indicating that the slot is changed to slot 2. In FIG. 6, since RF tag 2 and RF tag 3 transmit the RN16 at the same time, a collision occurs and thus the reader and writer 100 cannot correctly receive data.

Since the communication unit 312 cannot correctly receive the RN16 within a predetermined time, the communication unit transmits a Q-rep (Query-Rep) command again and goes to slot 3. RF tags 2 to 4 receive the Query-Rep command and acquire information indicating that the slot is changed to slot 3. RF tag 4 transmits an RN16, receives an Ack command, and returns an ID, similarly to RF tag 1 at slot 1.

Then, the communication unit 312 transmits a Query-Rep command and goes to the next slot (slot 4). Similarly, RF tag 4 changes its flag to B and stops its response. RF tags 2 and receive the Query-Rep command and acquire information indicating that the slot is changed to slot 4. In the example shown in FIG. 6, no tag transmits the RN16 at slot 4.

The communication unit 312 goes to the next round (round 2) and transmits a Query command. Similarly, the Query command includes at least a parameter indicating that the number of slots per round is 4 and a parameter indicating that an RF tag having a flag of A is a target.

RF tag 1 and RF tag 4 have a flag of B and thus stop their transmission. When receiving the Query command, RF tag 2 and RF tag 3 generate a random number, determines at what slot out of four slots of a round to respond, and generates a data RN16 for response, similarly to round 1. In FIG. 6, it is assumed that RF tag 2 responses at slot 1 and RF tag 3 responses at slot 2. Similarly, RF tag 2 transmits the RN16, receives an Ack command, and returns an identification ID, and the communication unit 312 correctly receives the identification ID.

The communication unit 312 transmits a Query-Rep command and goes to the next slot (slot 2). Similarly, RF tag 2 changes the flag to B and stops its response. RF tag 3 receives the Query-Rep command and acquires information indicating that the slot is changed to slot 2. Similarly, RF tag 3 transmits the RN16, receives an Ack command, and returns an identification ID. An example is shown where the communication unit 312 cannot correctly receive the identification ID returned by RF tag 3 at slot 2 of round 2. The example where the identification ID cannot correctly be received includes an example where the error detectors 341 and 342 shown in FIG. 4 detect an error using an error detection code such as a CRC (Cyclic Redundancy Check) code included in the data about the returning of the identification ID or an example where the preamble detectors 336 and 337 shown in FIG. 4 do not detect a preamble within a predetermined time. In this way, when the identification ID cannot correctly be received, the communication unit 312 transmits a Nak command indicating that the ID cannot correctly be received from RF tag 3. RF tag 3 receives the Nak command.

The communication unit 312 transmits the Query-Rep command similarly and goes to slot 3. RF tag 3 receives the Nak command and the flag is maintained in a state of A. At slot 3, no RF tag responses. Similarly, at slot 4, no RF tag responses.

The communication unit 312 goes to the next round (round 3) and transmits a Query command. As described above, the Query command includes at least a parameter indicating that the number of slots per round is 4 and a parameter indicating that an RF tag having a flag of A is a target. RF tag 1, RF tag 2, and RF tag 4 have a flag of B and thus stop their transmission. In round 3, the antenna device 90 of the reader and writer 100 moves to a position of B in FIG. 7 and can satisfactorily communicate with RF tag 3.

When the Query command is received, RF tag 3 generates a random number, determines at what slot out of four slots of a round to respond, and generates a data RN16 for response, similarly to round 1. FIG. 6 shows an example where RF tag responses at slot 2. Since the processes from the transmission of the RN16 to the transmission of the identification ID are similar to those of other RF tags, description thereof is not made. After slot 3 of round 3, no tag responses.

In this way, the communication unit 312 performs a communication processing with the RF tags using a slot aloha method of performing a communication process with an RF tag as an information acquisition target at each of plural time slots of a round, and transmits a response request command (such as a Query command) to the RF tags, acquires responses (RN16) transmitted from an RF tag with the reception of the response request command, transmits a tag information request command (Ack command) for requesting for transmitting tag information, which is information stored in the RF tag, to the RF tag having transmitted the acquired response, and acquires the tag information transmitted from the RF tag with the acquisition of the tag information request command, at each time slot.

In the first embodiment, the communication unit 312 stores the identification IDs acquired as described above in the memory unit 311. The communication unit 312 includes a slot number information acquiring section 322 acquiring information (slot number information) indicating the number of slots $n_{SL0}$ (=$2^Q$) per round in the course of the communication process with the RF tags, a communication number counter 324 generating information (communication number information) indicating the number of slots $n_{ACK0}$ at which the Ack command has been transmitted in the communication process when the communication process of one round with the RF tags is finished, and a communication success number counter 326 generating information (communication success number information) indicating the number of slots $n_{ID}$ at which the identification ID is acquired in the communication process when the communication process of one round with the RF tags is finished. The communication unit 312 transmits the slot number information and the communication number information to the communication rate calculator 313. The communication unit 312 transmits the communication number information and the communication success number information to the communication success rate calculator 314.

The communication rate calculator 313 calculates a communication rate which is a rate of the number of time slots at which the communication with one RF tag is made in one round on the basis of the number of time slots at which the tag information request command is transmitted in one round and the number of time slots in one round.

Specifically, the communication rate calculator 313 considers the slot at which the reader and writer 100 transmits the Ack command as a slot at which individual communication is made and calculates the communication rate on the basis of the acquired slot number information and the acquired communication number information. In the protocol of ISO 18000-6 type C, it is prescribed that an RF tag corresponding to details of an Ack command should return an identification ID when the reader and writer 100 (the communication unit 312) transmits the Ack command. Accordingly, the slot at which the reader and writer 100 transmits the Ack command can be considered as a slot at which the individual communication with a specific RF tag is made. The communication rate calculator 313 calculates the communication rate $a_{ACK}=n_{ACK}/n_{SL0}$ in a round on the basis of the number of slots $n_{SL0}$ and the communication number $n_{ACK}$ in a round acquired from the communication unit 312.

In the example shown in FIG. 6, the communication rate calculator 313 calculates the communication number as $n_{ACK}=2$ and the communication rate as $a_{ACK}=2/4=0.5$ in round 1. Similarly, the communication rate calculator 313 calculates $n_{ACK}=2$ and $a_{ACK}=2/4=0.5$ in round 2, calculates $n_{ACK}=1$ and $a_{ACK}=1/4=0.25$ in round 3, and calculates $n_{ACK}=0$ and $a_{ACK}=0/4=0$ in round 4 and the subsequent rounds.

The communication success rate calculator 314 calculates the communication success rate $a_{ID}=n_{ACK0}$ with the RF tags in round 1 on the basis of the number of time slots $n_{ACK0}$ at which an Ack command for requesting for transmitting the tag information is transmitted from the communication unit 312 in the communication process of the communication unit 312 with the RF tags and the number of time slots $n_{ID}$ at which the identification ID is acquired from the RF tags as a response to the Ack command.

Specifically, the communication success rate calculator 314 acquires communication success number information indicating the number of time slots $n_{ID}$ at which the reception of the identification ID is successful in round 1 and communication number information indicating the number of time slots $n_{ACK0}$ at which the Ack command is transmitted in the round from the communication unit 312. Here, $n_{ACK0}$ is the same as the number of times by which the RF tags transmit the identification ID as a response. Therefore, the communication success rate calculator 314 calculates the communication success rate per round as $a_{ID}=n_{ID}/n_{ACK0}$.

In the example shown in FIG. 6, the communication success rate calculator 314 calculates the communication success number as $n_{ID}=2$, the communication number as $n_{ACK}=2$, the communication success rate as $a_{ID}=2/2=1$ in round 1. Similarly, the communication success rate calculator 314 calculates $n_{ID}=1$, $n_{ACK}=2$, and $a_{ID}=1/2=0.5$ in round 2, calculates $n_{ID}=1$, $n_{ACK}=1$, and $a_{ID}=1/1=1$ in round 3, and calculates $n_{ID}=0$, $n_{ACK}=0$, and $a_{ID}=0/0=0$ in round 4.

In the protocol of ISO 18000-6 type C, after the reader and writer 100 transmits the Ack command, the number of RF tags returning an ID is 1. Therefore, after transmitting the Ack command, the collision with another RF tag does not occur in the slot. Accordingly, the communication success rate $a_{ID}$ is a value indicating the communication state with the RF tag of which a one-to-one communication (individual communication) with the RF tag reader and writer is established and is a value from which an error factor due to the collision is excluded.

In the example shown in FIG. 6, for the purpose of easy understanding, the reader and writer 100 transmits the Ack command only once at the slot at which the Ack command is transmitted. However, the invention is not limited to this configuration, but the reader and writer 100 may repeatedly transmit the Ack command at the same slot when an error is detected in receiving the identification ID. In this case, the number of times by which the first Ack command is transmitted at each slot corresponds to the communication number.

The communication success rate calculator 314 calculates the communication success rate as $a_{ID}=n_{ID}/n_{ACK}$ on the basis of the communication success number $n_{ID}$ and the number of times $n_{ACK}$ by which the Ack command is transmitted in a calculation period (for example, one round), when the Ack command is transmitted plural times at one time slot.

Accordingly, in the first embodiment, the communication number counter 324 of the communication unit 312 together performs a process of generating the communication number information and a process of generating information (Ack command transmission number information) on the number of times by which the Ack command is transmitted. Therefore, the communication number counter 324 can be referred to as an Ack command transmission number counter.

The communication stability determining unit 315 acquires the communication success rate reference information which is stored in the memory unit 311 and which is a reference for the communication success rate $a_{ID}$, and determines whether the communication state with the RF tag is good on the basis of a comparison result of the communication success rate $a_{ID}$ calculated by the communication success rate calculator 314 with the communication success rate reference information (communication state determining process). Specifically, the communication stability determining unit 315 determines that the communication state is good when the communication success rate $a_{ID}$ is equal to or greater than the communication success rate reference designated by the communication success rate reference information. The communication stability determining unit 315 determines that the communication state is not good when the communication success rate $a_{ID}$ is less than the communication success rate reference designated by the communication success rate reference information.

In the first embodiment, the communication stability determining unit 315 does not perform the communication state determining process on the round in which the communication rate calculated by the communication rate calculator 313 is 0. The communication stability determining unit 315 performs the communication state determining process on the round in which the communication rate calculated by the communication rate calculator 313 is greater than 0.

An example of the communication success rate reference information stored in the memory unit 311 is shown in FIG. 8. In FIG. 8, in the round in which the communication rate is 0, the communication stability determining unit 315 determines that no RF tag exists in the communication range or the reading is finished (determination result 1) and thus does not determine the communication state (that is, does not determine the communication state but considers the communication state as determination result 1). When the communication rate is greater than 0 but the communication success rate is less than the reference, the communication stability determining unit 315 determines that an RF tag responding exists but the communication state is not good (determination result 2) When the communication rate is greater than 0 and the communication success rate is equal to or greater than the reference, the communication stability determining unit 315 determines that an RF tag responding exists and the communication state is good (determination result 3).

In the first embodiment, the determination results are correlated with notification details to be notified to a user via the display unit 37 and are stored in the memory unit 311 as a communication success rate determination table including the communication success rate reference information. The controller 31 displays the notification details stored in the communication success rate determination table in correlation with the determination results on the display unit 37, when the communication stability determining unit 315 performs the communication state determining process (more specifically, when the controller 31 receives a notification that the determination results are stored in the memory unit 311 from the communication stability determining unit 315). In the first embodiment, the controller 31 displays the communication rate and/or the communication success rate along with the notification details on the display unit 37.

As shown in FIG. 9, the communication stability determining unit 315 stores the determination result in the memory unit 311 in correlation with the round, the communication rate, and the communication success rate. The communication stability determining unit 315 notifies the position determining unit 316 that the communication state is determined. In FIG. 9, the reference for the communication success rate is set to 0.7.

The position determining unit 316 acquires the determination result from the memory unit 311 on the basis of the notification from the communication stability determining unit 315, and determines that the position of the antenna (antenna device 90) of the reader and writer 100 is shifted between the rounds when the determination result by the communication stability determining unit 315 varies between the successive rounds.

Specifically, when the communication state is changed from the state where "the communication state is not good (determination result 2)" to the state where "the communication is good (determination result 3)" or when the determination result by the communication stability determining unit 315 is changed from "no RF tag exists around or the reading from the RF tag is finished (determination result 1)" to "the communication state is good (determination result 3)", the position determining unit 316 determines that the position of the antenna of the reader and writer 100 is shifted. Accordingly, it is possible to detect the movement of the antenna. The controller 31 may display the determination result by the position determining unit 316 on the display unit 37. Accordingly, a user can see that the reader and writer 100 correctly detects the movement or that the reader and writer 100 correctly works. It is possible to obtain the position information in addition to the identification ID of the RF tag.

In the first embodiment, the position determining unit 316 notifies the grouping unit 317 that the position of the antenna is shifted.

The grouping unit 317 groups the identification IDs acquired from one or plural RF tags out of the identification IDs stored in the memory unit 311 before the shift in position of the antenna on the basis of the notification that the position of the antenna is shifted from the position determining unit 316, and stores the grouped identification IDs in the memory unit 311.

Specifically, the grouping unit 317 groups and stores the identification IDs not having been grouped but stored in the memory unit 311 before the notification from the position determining unit 316, as shown in FIG. 10. That is, the grouping unit 317 groups the acquired identification IDs on the basis of the shift in position. Accordingly, the user can easily recognize the identification IDs received at the same position.

In the first embodiment, as shown in FIG. 10, the grouping unit 317 can easily confirm a moving path of the antenna and can intuitively recognize the path, by storing the grouped identification IDs in a predetermined memory area in correlation with information on the grouping and storing order.

In the first embodiment, the controller 31 can specifically include a processing unit such as a CPU or an MPU mounted on the reader and writer body 30, a RAM, and a ROM.

Figure 11:
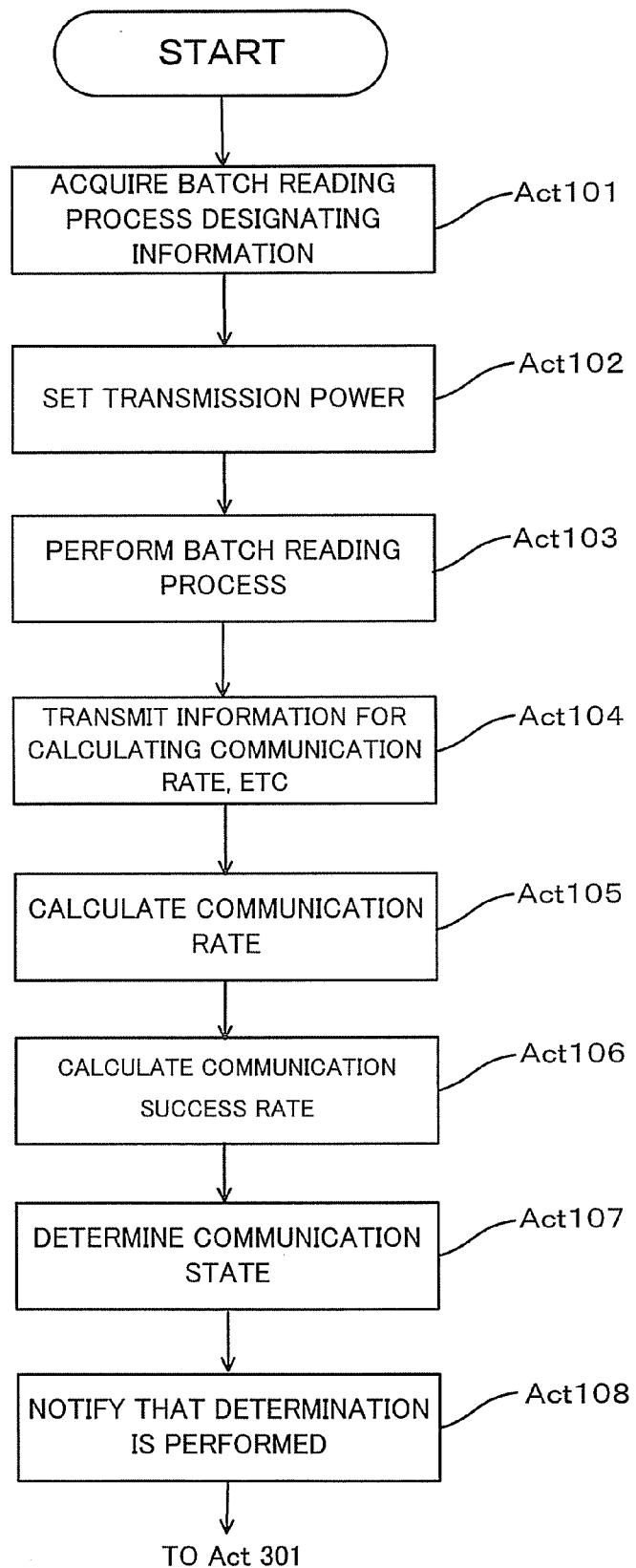
FIG. 11 is a flow diagram illustrating the flow of the communication success rate calculating process and the communication state determining process according to the first embodiment.

The flow of a communication process with an RF tag in the reading process (batch reading process) on unspecified RF tags, which is performed by the reader and writer 100 according to the first embodiment, will be described with reference to FIG. 11. In the following description, it is assumed that the magnitude of the transmission power from the reader and writer 100 is set in advance in the reader and writer body 30. In the following description, it is assumed that the number of slots per round in the batch reading process is set in advance in the reader and writer 100 and the communication unit 312 performs the communication process corresponding to the set number of slots on the basis of the protocol of ISO 18000-6 type C. In the below-described flow of processes, a selective reading process or a selective writing process can be performed, but the processes can be embodied using known methods and thus will not be described. The selective reading process and the like may not be performed.

First, in Act 101, the controller 31 acquires process designating information indicating which of the batch reading, the selective reading, and the selective writing should be performed on the basis of a user's input. Specifically, the controller 31 generates a process designating picture shown in FIG. 12 and displays the generated process designating picture on the display unit 37. A user designates a desired process by the use of the input unit 35 on the basis of the process designating picture displayed on the display unit 37. The control unit 31 acquires the process designating information by means of the user's designation using the input unit 35. Here, the controller 31 acquires the process designating information which designates the batch reading process via the picture.

In Act 102, the controller 31 sets the transmission power for the RF unit 33 on the basis of electric wave power information corresponding to the batch reading and being stored in the memory unit 311. The controller 31 notifies the communication unit 312 of the controller 31 that the setting of the transmission power is finished.

In Act 103, the communication unit 312 controls the RF unit 33 to radiate electric waves corresponding to the batch reading from the antenna device 90 so as to perform the batch reading and performs a process of acquiring information (identification IDs) stored in the RF tags. The communication unit 312 transmits the slot number information acquired from the memory unit 311 by the slot number information acquiring section 322 with the performing of the communication process, the communication number information generated by the communication number counter 324 with the end of the communication process in one round, and the communication success number information generated by the communication success number counter 326 with the end of the communication process in one round to the communication rate calculator 313 and the communication success rate calculator 314 (Act 104; transmission of information on the slot number and the like). Specifically, the communication unit transmits the slot number information and the communication number information to the communication rate calculator 313 and transmits the communication success number information and the communication number information to the communication success rate calculator 314.

In Act 105, the communication rate calculator 313 calculates the communication rate from the slot number information and the communication number information when acquiring the slot number information and the communication number information. Then, the communication rate calculator 313 transmits the calculated communication rate to the communication stability determining unit 315.

In Act 106, the communication success rate calculator 314 calculates the communication success rate from the communication number information and the communication success number information when receiving the communication number information and the communication success number information. Then, the communication success rate calculator 314 transmits the calculated communication success rate to the communication stability determining unit 315. The order for performing Act 106 and Act 105 is not particularly limited, and for example, Act 106 may be first performed.

In Act 107, when acquiring the communication rate and the communication success rate, the communication stability determining unit 315 determines the communication state. The communication stability determining unit 315 stores the determination result in the memory unit 311 and notifies the controller 31 that the communication state is determined. The controller 31 displays the notification details corresponding to the communication state determination result shown in FIG. 8 on the display unit 37 on the basis of the notification (Act 108). In the first embodiment, the communication stability determining unit 315 also notifies the position determining unit 316 that the communication state is determined (to Act 301).

Figure 13:
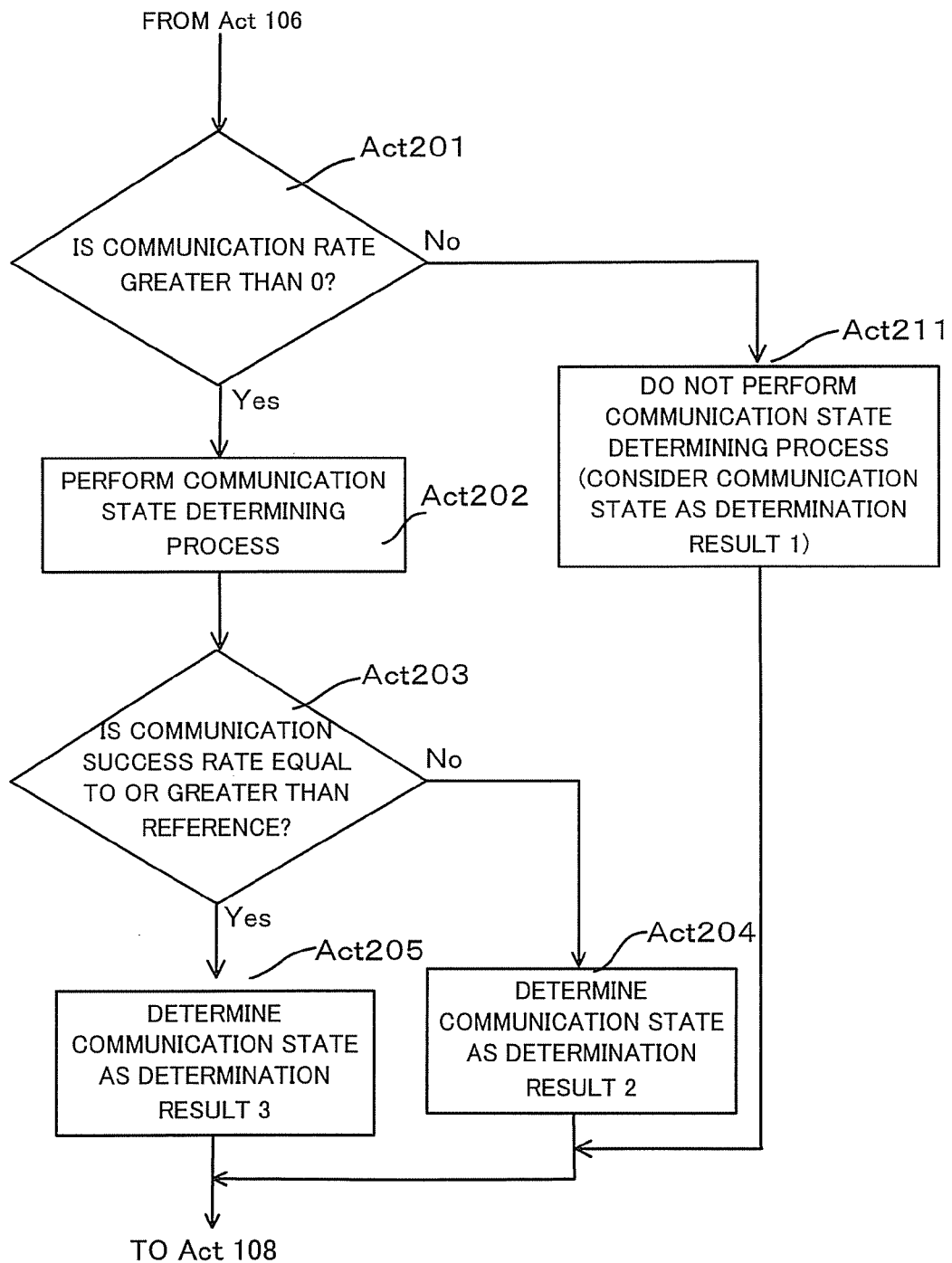
FIG. 13 is a flow diagram illustrating the flow of the communication state determining process according to the first embodiment.

The flow of the communication state determining process in the communication stability determining unit 315 according to the first embodiment will be described in detail with reference to FIG. 13.

First, in Act 201, the communication stability determining unit 315 determines whether the acquired communication rate is 0. When it is determined that the communication rate is 0, the communication stability determining unit 315 does not perform the communication state determining process using the communication success rate but determines the communication state as determination result 1 shown in FIG. 8 (Act 211). The communication stability determining unit 315 stores determination result 1 in the memory unit 311 in correlation with the round, the communication success rate, and the communication rate, as shown in FIG. 9.

On the other hand, when the communication rate is greater than 0, the communication stability determining unit 315 acquires the communication success rate reference information from the memory unit 311 and compares the acquired communication success rate reference information with the acquired communication success rate in Act 202. When the acquired communication success rate is smaller than the communication success rate reference, the communication stability determining unit 315 determines the communication state as determination result 2 shown in FIG. 8 (Act 203). The communication stability determining unit 315 stores determination result 2 in the memory unit 311 in correlation with the round as shown in FIG. 9. On the other hand, when the acquired communication success rate is equal to or greater than the communication success rate reference, the communication stability determining unit 315 determines the communication state as determination result 3 shown in FIG. 8 (Act 204). The communication stability determining unit 315 stores determination result 3 in the memory unit 311 in correlation with the round as shown in FIG. 9.

Figure 14:
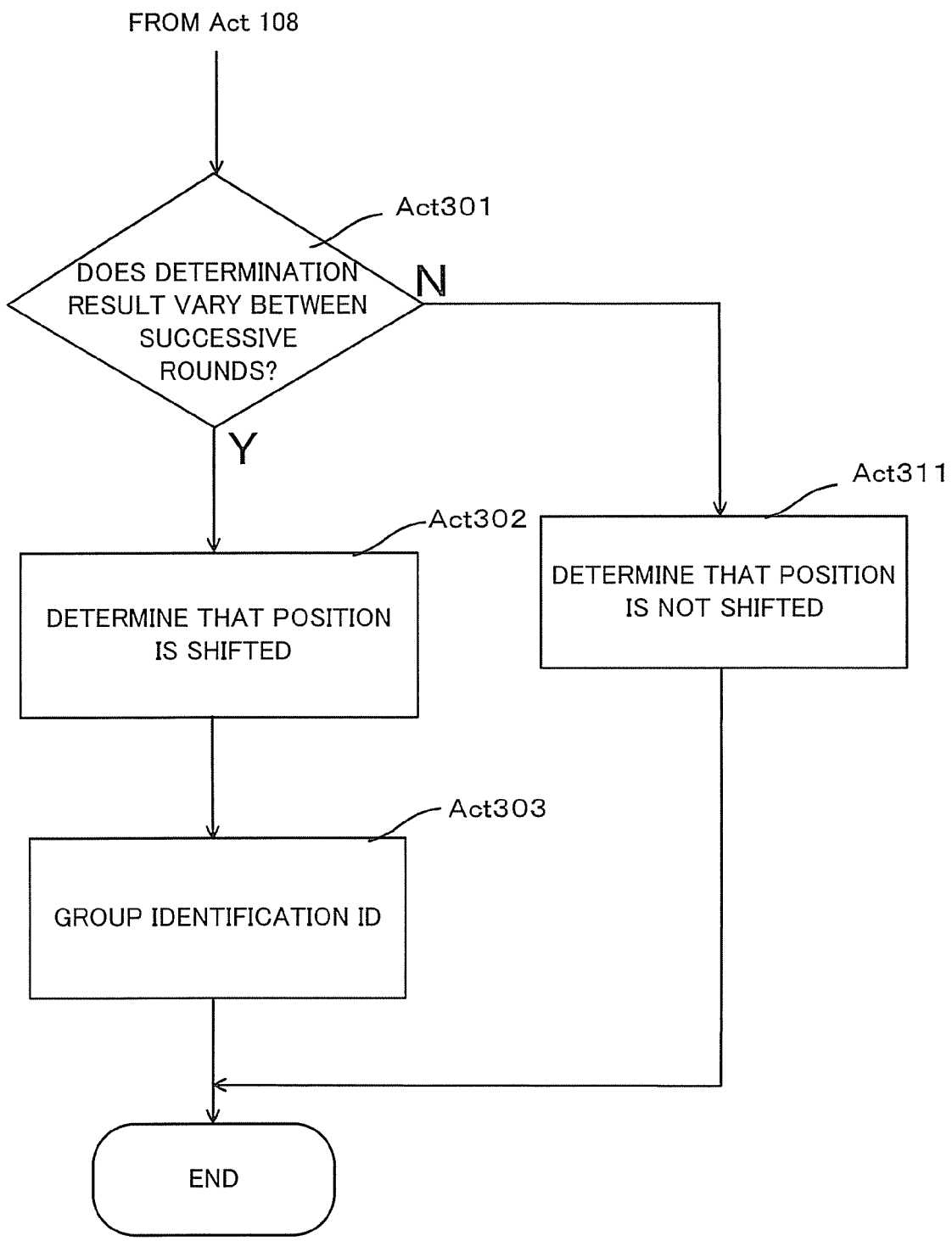
FIG. 14 is a flow diagram illustrating a position determining process and an identification ID grouping process according to the first embodiment.

The flow of the position determining process and the identification ID grouping process based on the position determining process will be described with reference to FIG. 14.

First, in Act 301, the position determining unit 316 acquires the determination result of the communication state from the memory unit 311 and determines whether the determination result by the communication stability determining unit 315 varies between successive rounds, when it is notified that the communication state is determined. When the determination result does not vary between the successive rounds, the position determining unit 316 determines that the position of the antenna of the reader and writer 100 is not shifted and ends the flow of processes (Act 311). On the other hand, when it is determined that the determination result by the communication stability determining unit 315 varies between the successive rounds, the position determining unit 316 determines that the position of the antenna of the reader and writer 100 is shifted (Act 302). Then, the position determining unit 316 notifies the grouping unit 317 that the position of the antenna is shifted.

In Act 303, the grouping unit 317 groups the identification IDs, which are acquired before the determination that the position of the antenna is shifted and are stored in the memory unit 311 in a non-correlated state (a non-grouped state), and stores the grouped identification IDs in the memory unit 311, when receiving the notification that the position of the antenna is shifted from the position determining unit 316.

According to the first embodiment of the invention, it is possible to more accurately see the communication state of the reader and writer 100 on the basis of the calculated communication success rate. Specifically, when it is not possible to acquire the tag information such as the identification ID, it is possible to determine whether the reason is based on the collision or other factors. By notifying the user of the communication success rate via the display unit 37 or the like, the user can recognize the communication state in real time.

Second Embodiment

A second embodiment of the invention will be described below. The elements common to the first embodiment are referenced by like reference numerals and description thereof is not repeated.

Figure 15:
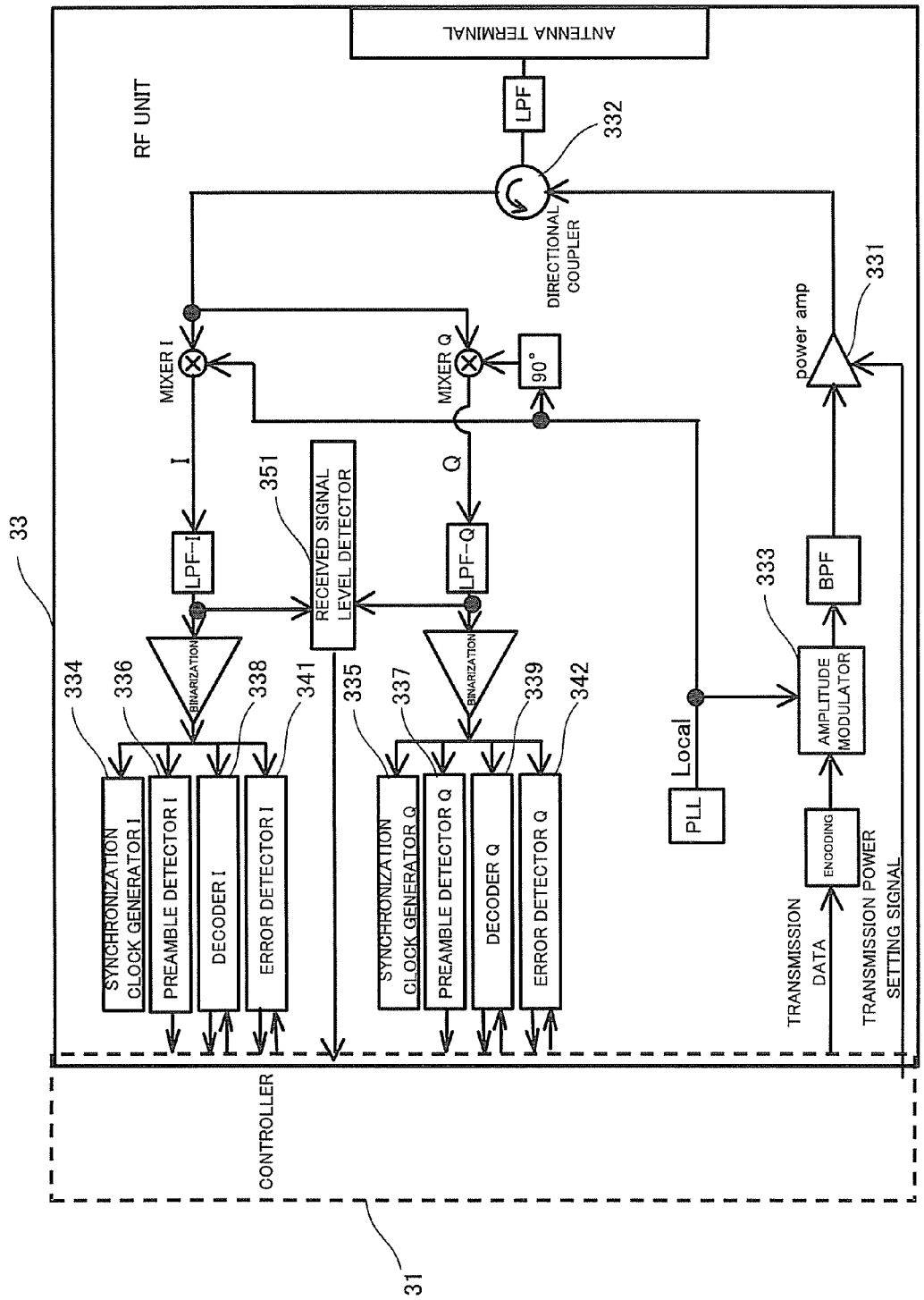
FIG. 15 is a circuit diagram illustrating an RF unit of an RF tag reader and writer according to a second embodiment of the invention.

FIG. 15 is a block diagram illustrating the configuration of the RF unit 33 according to the second embodiment of the invention. In the second embodiment, the RF unit 33 includes a received signal level detector having a function of detecting a received signal level (the intensity of a received signal) from an RF tag in addition to the configuration described in the first embodiment. The received signal level detector can be configured to detect and output a larger amplitude of the amplitudes of an I signal and a Q signal. Alternatively, since the I signal and the Q signal are orthogonal to each other, the received signal level detector may be configured to detect and output a vector-summed amplitude ($=\sqrt{(I^2+Q^2)}$, where I and Q represent the amplitude of the I signal and the amplitude of the Q signal, respectively) thereof.

Figure 16:
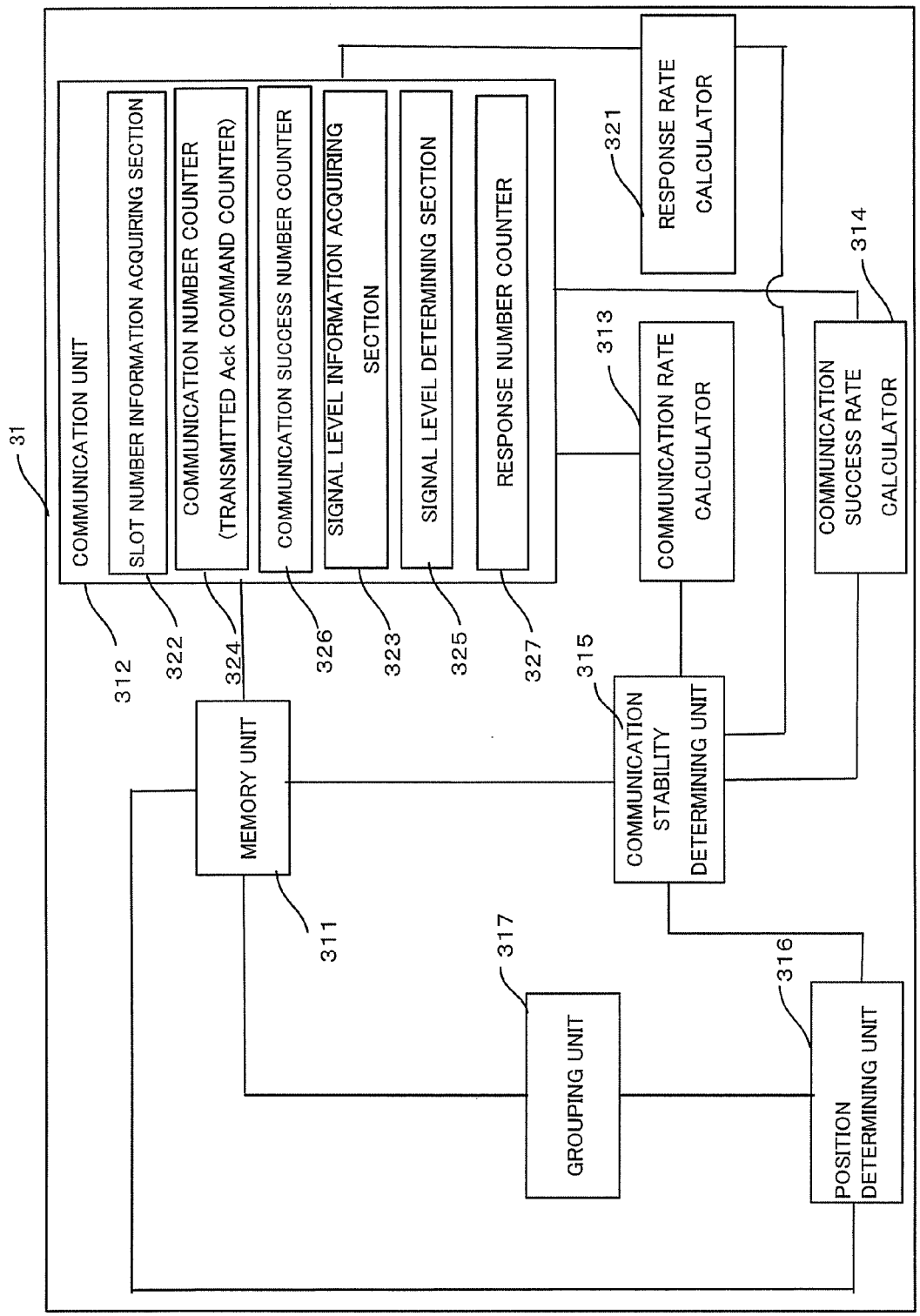
FIG. 16 is a functional block diagram illustrating a communication success rate calculating process and a communication state determining process according to the second embodiment.

FIG. 16 is a block diagram illustrating the configuration of a controller according to the second embodiment. In the second embodiment, the controller 31 includes a response rate calculator 321 in addition to the configuration described in the first embodiment. The communication unit 312 includes a received signal level information acquiring section 323, a signal level determining section 325, and a response number counter 327.

The received signal level information acquiring section 323 acquires received signal level information, which is information on the intensity of the received signal transmitted from an RF tag, from the received signal level detector.

The signal level determining section 325 acquires signal level reference information which is a reference for the received signal level and which is stored in the memory unit 311, and determines whether the received signal level transmitted from the RF tag is greater than the reference for every time slot on the basis of a comparison result of the signal level reference information and the received signal level information acquired by the received signal level information acquiring section 323. FIG. 17 is a diagram illustrating an example of the signal revel reference information in the second embodiment. In the time slot at which it is determined that the received signal level of an electric wave is greater than the reference, the signal level determining section 325 determines that a response is returned from the RF tag with the acquisition of a response request command (Query or Query-Rep) transmitted via the RF unit 33 from the communication unit 312.

The response number counter 327 counts the number of slots per round at which the signal level determining unit 325 determines that the received signal level of an electric wave is greater than the reference, and generates information of the number of slots $n_{RN16}$ (response number information) at which it is determined that the received signal level is greater than the reference.

The response rate calculator 321 acquires the response number information generated by the signal level determining section 325 and the slot number information indicating the number of time slots $n_{SL0}$ ($=2^Q$) in a round from the communication unit 312 and calculates a response rate $a_{RN16}=n_{RN16}/n_{SL0}$ indicating the rate of the number of time slots at which a response is transmitted from an RF tag. The response rate calculator 321 transmits the calculated response rate to the communication stability determining section 315.

Figure 18:
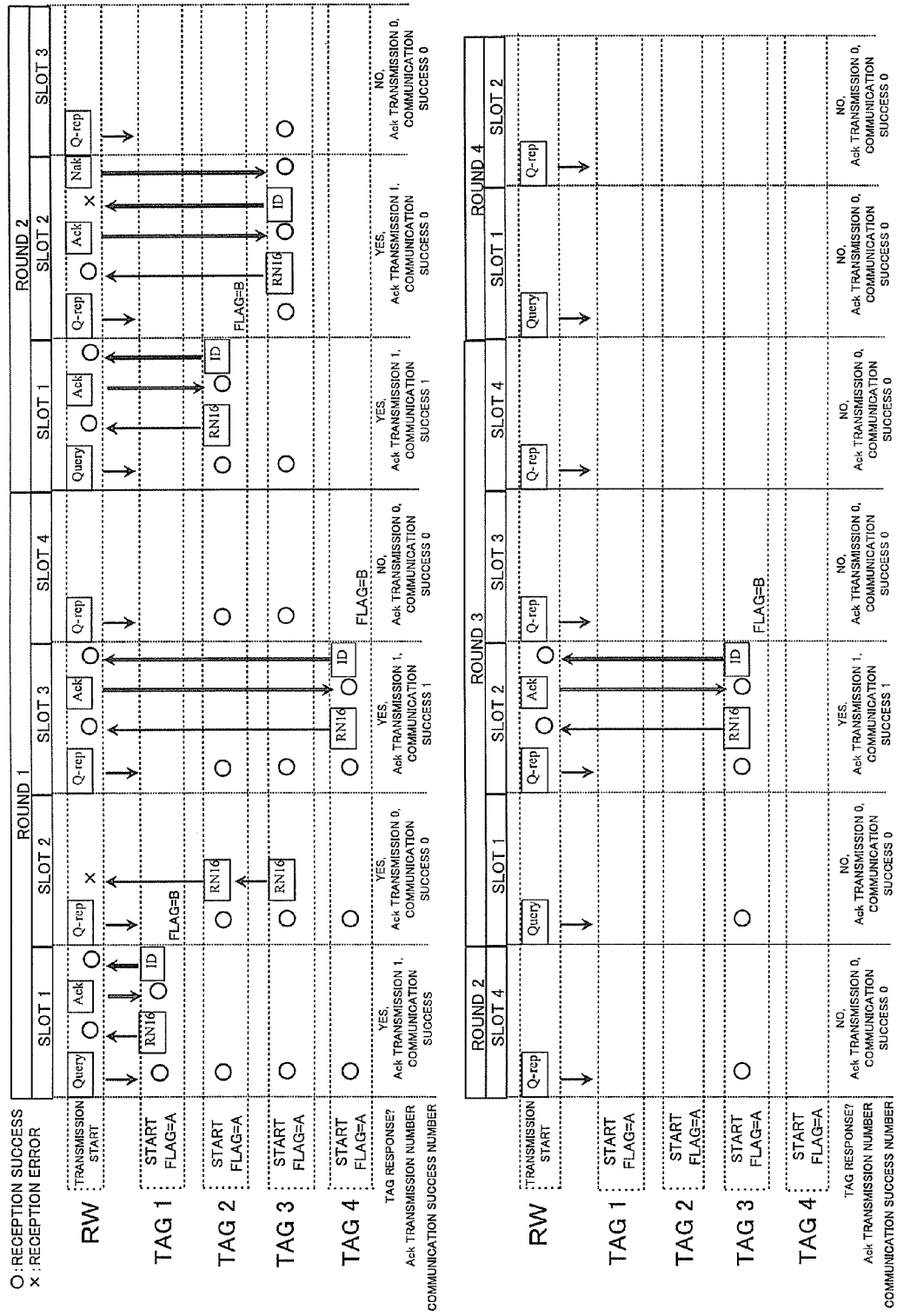
FIG. 18 is an examplary timing diagram illustrating a communication process based on ISO 18000-6 type C according to the second embodiment.

More specifically, FIG. 18 is a timing diagram illustrating the communication with an RF tag in the second embodiment. In round 1, the response rate is $a_{RN16}=n_{RN16}/n_{SL0}=3/4=0.75$. When a reference for the response rate is 0.1, the operation is completely the same as shown in FIG. 6. In the ISO 18000-6 type C, as described above, each RF tag generates a random number and determines a slot at which a response should be transmitted. In view of probability, all tags may collide with each other. When the response rate calculator is used, the communication state determining unit can determine that a tag responding exists even in this case.

When the response rate calculated by the response rate calculator 321 is 0, the communication stability determining unit 315 does not determine the communication state (does not determining the communication state and considers the communication state as determination result 1) in the round corresponding to the response rate. On the other hand, the communication stability determining unit 315 performs the communication state determining process on a round in which the communication rate calculated by the communication rate calculator 313 is greater than 0, similarly to the first embodiment. The communication success rate reference information in the second embodiment is shown in FIG. 19. As shown in FIG. 20, the communication stability determining unit 315 stores the determination result in the memory unit 311 along with the communication success rate, the communication rate, and the response rate.

In the ISO 18000-6 type C, as described above, each RF tag generates a random number and determines a slot at which a response should be transmitted. Accordingly, all tags may collide with each other in a slot. As a result, particularly when the number of slots is set to be small, the identification ID may not be acquired in the corresponding round. In the second embodiment, the response rate calculator 321 calculates the response rate which is the rate of the number of slots in which a response is returned, and the communication stability determining unit 315 determines the communication state using the response rate.

Accordingly, when it is assumed that the communication success rate is low, a user can recognize that the reason of the low communication success rate is the collision between signals. Therefore, it is possible to further reduce the reading omission of the RF tags.

Figure 21:
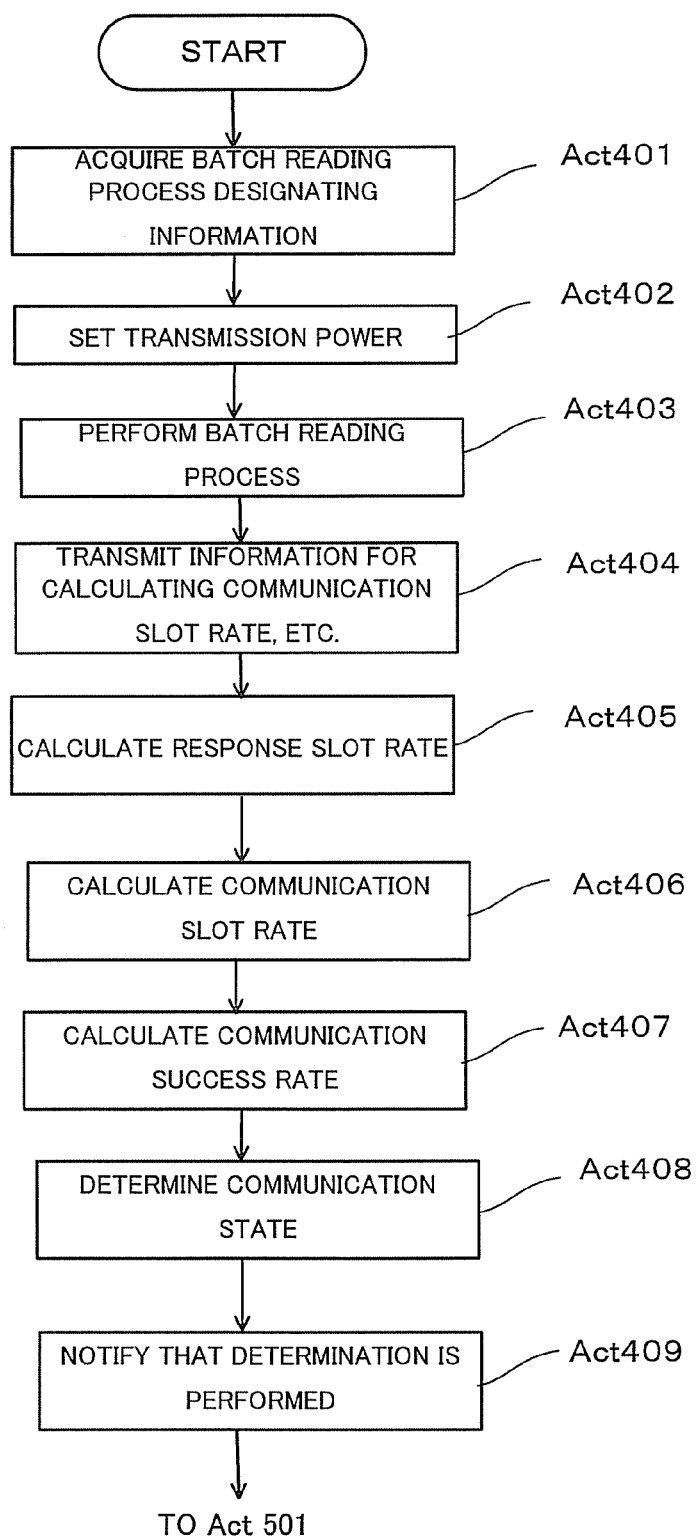
FIG. 21 is a flow diagram illustrating the flow of the communication success rate calculating process and the communication state determining process according to the second embodiment.

The flow of the communication process with an RF tag in the reading process (batch reading process) on unspecified RF tags, which is performed by the reader and writer 100 according to the second embodiment, will be described with reference to FIG. 21. The processes of Act 401 to Act 403 are common to Act 101 to Act 103 in the first embodiment and thus will not be described.

In Act 404, the communication unit 312 stores the identification ID acquired in the communication process in the memory unit 311 and transmits information on the number of slots $n_{ID}$ at which the identification ID is successfully acquired in each round, the number of slots $n_{ACK0}$ at which the Ack command is transmitted in each round, and the number of slots $n_{SL0}$ per round and information on the number of slots $n_{RN16}$ at which response is transmitted generated by the response number counter 327 to the communicate rate calculator 313, the communication success rate calculator 314, and the response rate calculator 321 (transmission of information of the number of slots or the like).

In Act 405, the response rate calculator 321 calculates the response rate ($a_{RN16}=n_{RN16}/n_{SL0}$) on the basis of the acquired slot number information and the acquired response number information. The response rate calculator 321 transmits the calculated response rate to the communication stability determining unit 315.

In Act 406, the communication rate calculator 313 calculates the communication rate ($a_{ACK}=n_{ACK0}/n_{SL0}$) on the basis of the acquired slot number information and the acquired communication number information. The communication rate calculator 313 transmits the calculated communication rate to the communication stability determining unit 315.

In Act 407, the communication success rate calculator 314 calculates the communication success rate ($a_{ID}=n_{ID}/n_{ACK0}$) on the basis of the acquired communication number information and the communication success number information.

The communication success rate calculator 314 transmits the calculated communication success rate to the communication stability determining unit 315. Similarly to the first embodiment, the order of performing the processes of Act 405 to Act 407 is not particularly limited.

In Act 408, the communication stability determining unit 315 performs the communication state determining process on the basis of the response rate, the communication rate, and the communication success rate. The communication stability determining unit 315 stores the determination result in the memory unit 311 and notifies the controller 31 that the communication state is determined. The controller 31 displays the notification details stored in the memory unit 311 in correlation with the determination results of the communication state on the display unit 37 on the basis of the notification (Act 409). In the second embodiment, the communication stability determining unit 315 also notifies the position determining unit 316 that the communication state is determined (to Act 301).

Figure 22:
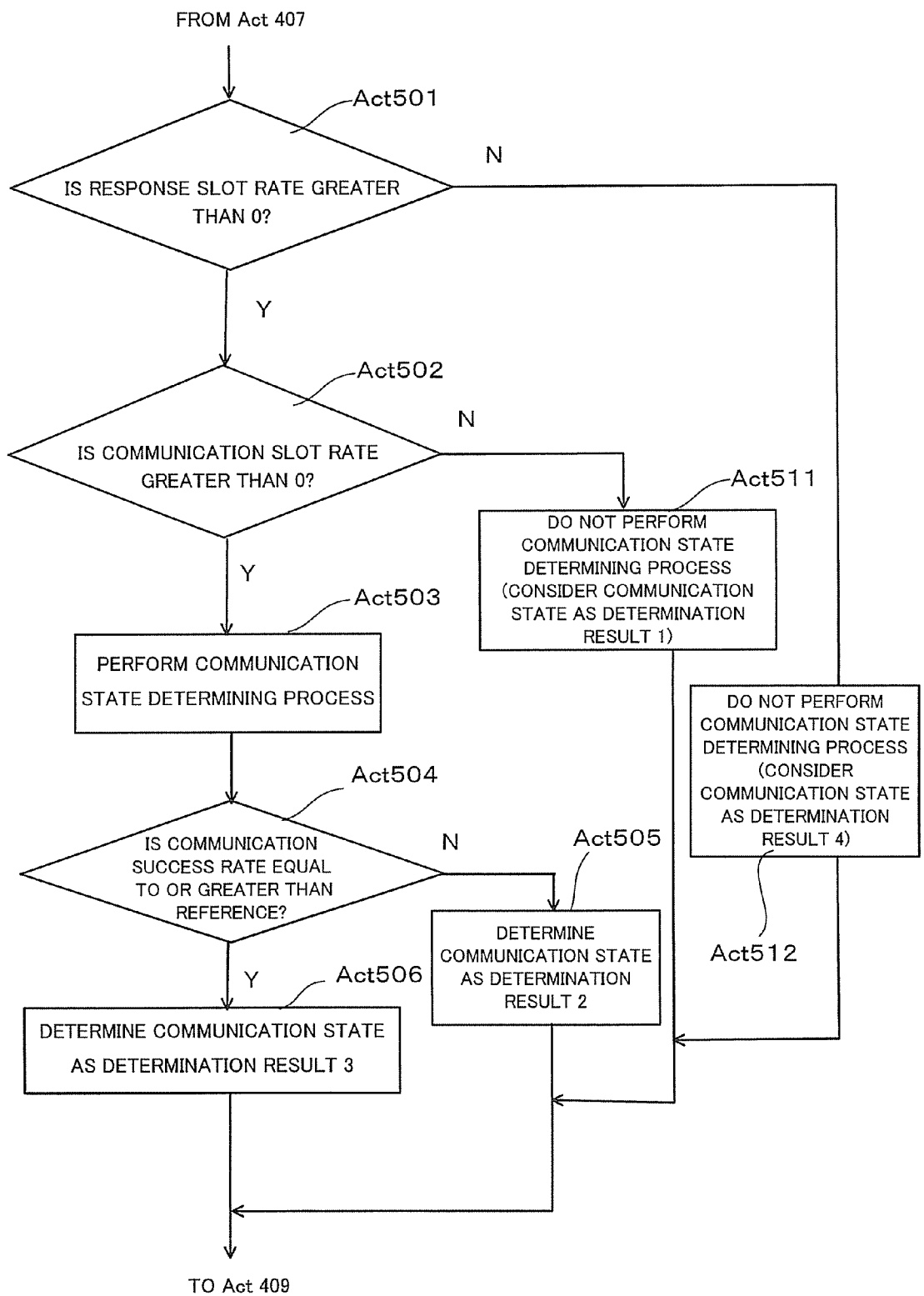
FIG. 22 is a flow diagram illustrating the flow of the communication state determining process according to the second embodiment.

The flow of the communication state determining process by the communication stability determining unit 315 in the second embodiment will be described with reference to FIG. 22. The processes of Act 502 to Act 506 and the process of Act 511 are common to the processes of Act 201 to Act 205 and the process of Act 211 in the first embodiment and thus will not be described.

First, in Act 501, the communication stability determining unit 315 determines whether the acquired response rate is 0. When the response rate is 0, the communication stability determining unit 315 does not perform the communication state determining process using the communication success rate but considers the communication state as determination result 4 shown in FIG. 19 (Act 512) The communication stability determining unit 315 stores determination result 4 in the memory unit 311 in correlation with the round.

On the other hand, when the response rate is not 0, the communication stability determining unit determines the communication state using the communication rate in Act 502.

Figure 23:
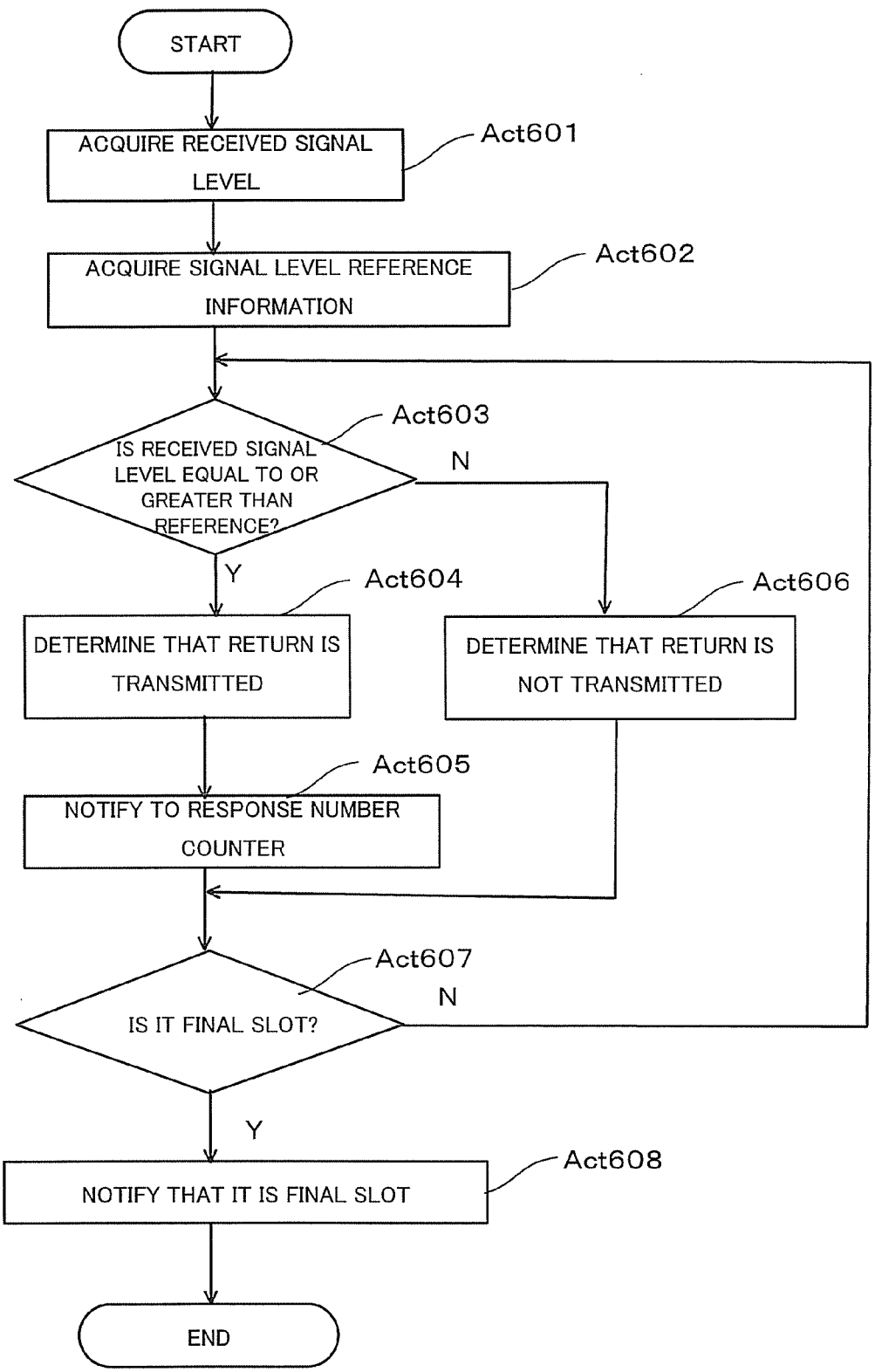
FIG. 23 is a flow diagram illustrating the flow of a response generation determining process according to the second embodiment.

The flow of the response determining process by the communication unit 312 will be described (FIG. 23).

First, in Act 601, the signal level determining section 325 acquires the received signal level information, which is information on the received signal level acquired from the received level detector of the RF unit 33 by the received signal level information acquiring section 323 by the communication of the communication unit 312 with an RF tag, from the received signal level information acquiring section 323.

In Act 602, the signal level determining section 325 acquires the signal level reference information from the memory unit 311 with the acquisition of the received signal level information and acquires the slot number information from the slot number information acquiring section 322.

In Act 603, the signal level determining section 325 determines whether the received signal level is equal to or greater than the reference on the basis of a comparison of the acquired received signal level information with the signal level reference information.

When the received signal level is equal to or greater than the reference, the signal level determining section 325 determines that a response from the RF tag is transmitted in the corresponding slot in Act 604. In Act 605, the signal level determining section 325 notifies the response number counter 327 that a response from the RF tag is transmitted (Act 605).

On the other hand, in Act 603, when it is determined that the received signal level is smaller than the reference, the signal level determining section 325 determines that a response from the RF tag is not transmitted in the corresponding slot (Act 606).

In Act 607, the signal level determining section 325 determines whether the slot in which the received signal level is determined is the final slot in the round. When the slot is not the final slot, the signal level determining section 325 repeatedly performs the process in Act 603.

On the other hand, when the slot in which the received signal level is determined is the final slot in the round, the signal level determining section 325 notifies the response number counter 327 that it is the final slot (Act 608). In response to the notification, the response number counter 327 generates the response number information using the notification in Act 605.

According to the second embodiment of the invention, even when the collision between the RF tags frequently occurs, the communication stability determining unit can determine that an RF tag responding exists in the communication range. Accordingly, it is possible to further reduce the reading omission of the RF tags.

Although the first and second embodiments are described above, the invention is not limited to the embodiments but may be modified in various forms.

For example, although it is described in the first and second embodiments that the calculation period is a round, the calculation period may include plural rounds.

In the first and second embodiments, the power information for controlling the transmission power, the setting information for determining the communication stability such as the round number information, the communication success rate reference information, and the signal level reference information are stored in the memory unit 311 including a ROM or a RAM in the reader and writer body 30. However, the invention is not limited to this configuration, but such information may be stored in a memory unit of an external device and may be acquired by the controller 31 via the interface unit 39 as needed.

In the first embodiment, the communication unit 312 may include a communication failure number counter calculating a communication failure number $n_{IDERR}=n_{ACK}-n_{ID}$ in addition to the communication success number $n_{ID}$. The controller 31 may display the communication failure number calculated by the communication failure number counter on the display unit 37. The controller 31 may further include a communication failure rate calculator calculating a communication failure rate $n_{ACK}-n_{ID})/n_{ACK}$ in the calculation period and may display the calculated communication error rate on the display unit 37.

In the first and second embodiments, the Query command is transmitted in the first slot of a round in the communication process with the RF tag. According to this configuration, an RF tag which could not correctly receive the Query command at the first slot of a round can participate in the communication when it can correctly receive the Query command at the first slot of the next round.

On the other hand, when the communication stability determining unit determines that the communication state is good, the Query-adjust command may be transmitted as a response request command in a calculation period successive to the calculation period (for example, one round) in which it is determined that the communication state is good. The Query command includes the parameter Q directly designating the number of slots per round as described above, but the Query-adjust command includes a relative parameter indicating the same as the multiplier Q of the number of slots in the previous round or ±1 thereof and has a small amount of data than that of the Query command. Accordingly, by transmitting the Query-adjust command, it is possible to efficiently communicate for a short time.

In the first embodiment, the communication rate and the communication success rate are calculated and the communication state is determined on the basis of the rates. However, the invention is not limited to this configuration, but the communication state may be determined on the basis of the communication success rate. In this case, the communication success rate reference information may have, for example, the structure shown in FIG. 24.

In the second embodiment, the communication rate and/or the communication success rate may be calculated using the response rate. For example, when the response rate is 0, some of the communication rates and the communication success rates may not be calculated.

In the first and second embodiments, the number of slots at which the tag information cannot be received may be calculated.

In addition to the configuration described in the first and second embodiments, the controller 31 may further include a collision rate calculator. The collision rate calculator calculates the number of slots at which a collision occurs in a calculation period (for example, one round) as $n_{COL}=n_{RN16}-n_{ACK0}$ (where $n_{RN16}$ represents the number of slots at which a response is transmitted, including the number of slots at which the RN16 is correctly received and the number of slots at which the RN16 cannot be correctly received due to the collision or the like, and $n_{ACK0}$ represents the number of slots at which the RN16 is correctly received) and calculates a collision rate as a slot rate at which the collision occurs per calculation period as $a_{COL}=n_{COL}/n_{SL0}$. When the communication stability determining unit 315 determines that $a_{COL}$ is greater than a collision rate reference (which is acquired from a predetermined memory area of the memory unit 11 or the like), the controller 31 may increase the number of slots per round. Accordingly, it is possible to reduce the slot rate at which the collision occurs and thus to efficiently communicate with the RF tags for a short time.

The controller 31 may further include a non-response rate calculator. The non-response rate calculator calculates the number of slots at which a response is not transmitted in the calculation period (for example, one round) as $n_{NA}=n_{SL0}-n_{RN16}$ (where $n_{SL0}$ represents the number of slots per round $2^Q$ and $n_{RN16}$ represents the number of slots at which a response is transmitted from the RF tags, including the number of slots at which the RN16 is correctly received and the number of slots at which the RN16 cannot be correctly received due to the collision or the like) and calculates a non-response rate as a rate of the number of slots at which a response is not transmitted per calculation period as $a_{NA}=n_{NA}/n_{SL0}$. The communication stability determining unit 315 may acquire information representing a reference for the non-response rate stored in a predetermined memory area of the memory unit 311 or the like and the controller 31 may decrease the number of slots per round when it is determined that $a_{NA}$ is greater than the non-response rate reference. Accordingly, it is possible to reduce the number of slots at which a response is not transmitted and to efficiently communicate with the RF tags for a short time.

A program causing a computer constituting the RF tag reader and writer to execute the above-mentioned processes may be provided as a tag information acquiring program. In the first and second embodiments, the program for implementing the functions of the invention is stored in advance in the memory unit 311 disposed in the reader and writer, but the invention is not limited to this configuration. The same program may be downloaded to the reader and writer via a network or a computer-readable recording medium storing the same program may be installed in the reader and writer. The type of the recording medium is not particularly limited, as long as it can store a program and can be read by a computer. Specifically, examples of the recording medium include an internal memory device such as a ROM or a RAM built in a computer, a portable recording medium such as a CD-ROM, a flexible disk, a DVD disk, a magneto-optical disk, and an IC card, a database storing a computer program, another computer or a database thereof, and a transmission medium in a network. The functions installed in advance or downloaded may be embodied along with an OS (Operating System) or the like in the reader and writer. In the embodiments, it is assumed that the program includes programs dynamically generating execution modules.

While certain embodiments have been described, these embodiments have been presented by way of example only, and are not intended to limit the scope of invention. Indeed, the novel method described herein may be embodied in a variety of other forms; furthermore, various omissions, substitutions and changes in the form of the apparatus and method described herein may be made without departing from the spirit of the inventions. The accompanying claims and their equivalents are intended to cover such forms or modifications as would fall within the scope and spirit of the inventions.

As described in detail above, according to the configurations described in this specification, it is possible to more accurately see the communication state in the communication with the RF tags.

What is claimed is:

1. An RF tag reader and writer comprising:
a communication unit that performs a communication process with an RF tag using a slot aloha method of performing the communication process with the RF tag as an information acquisition target at each of a plurality of time slots of a round, transmits a response request command to the RF tag at each time slot, acquires a response transmitted from the RF tag with an acquisition of the response request command, transmits a tag information request command for requesting for transmitting tag information, which is information stored in the RF tag, to the RF tag having transmitted the acquired response, and acquires the tag information transmitted from the RF tag with an acquisition of the tag information request command; and
a communication success rate calculator that calculates a communication success rate $a_{ID}=n_{ID}/n_{ACK}$ with the RF tag on the basis of the number of times $n_{ACK}$ by which the tag information request command for requesting for transmitting the tag information, which is information stored in the RF tag, in the communication process of the communication unit with the RF tag in a calculation period including one or more rounds and the number of times $n_{ID}$ by which the tag information is received from the RF tag as a return to the tag information request command in the calculation period including one or more rounds;
a signal level information acquiring section that acquires received signal level information which is information indicating the magnitude of a signal transmitted from the RF tag;
a signal level determining section that acquires signal level reference information, which is a reference for the magnitude of the received signal, stored in a predetermined memory area, determines whether the magnitude of the received signal transmitted from the RF tag is greater than the reference on the basis of a comparison result of the signal level reference information with the received signal level information acquired by the signal level information acquiring section for every time slot, and determines that a response is transmitted from the RF tag with the acquisition of the response request command transmitted from the communication unit at the time slot at which the magnitude of the received signal is greater than the reference;
a response rate calculator that calculates a response rate $a_{RN16}=n_{RN16}/n_{SLO}$ indicating a rate of the number of time slots at which the response is transmitted from the RF tag in the calculation period on the basis of the number of time slots $n_{RN16}$ at which it is determined by the signal level determining section that the response is transmitted in the calculation period and the number of time slots $n_{SLO}$ in the calculation period; and
a communication stability determining unit that performs a communication state determining process of determining whether a communication state with the RF tag is good on the basis of a comparison result of communication success rate reference information, which is a reference for the communication success rate and is acquired from a predetermined memory area, with the communication success rate $a_{ID}$ calculated by the communication success rate calculator, and does not perform the communication state determining process in the calculation period in which the response rate calculated by the response rate calculator is 0.

2. The RF tag reader and writer according to claim 1, wherein the communication stability determining unit performs the communication state determining process in the calculation period in which the response rate calculated by the response rate calculator is greater than 0.

3. The RF tag reader and writer according to claim 1, wherein the communication process in the communication unit is performed on the basis of a protocol of ISO 18000-6 type C, and
wherein the communication unit transmits a Query command at the first time slot in a round in the slot aloha method.

4. The RF tag reader and writer according to claim 1, wherein the communication process in the communication unit is performed in a plurality of the calculation periods set on the basis of a protocol of ISO 18000-6 type C, and
wherein when there exists the calculation period in which the communication stability determining unit determines that the communication state is good, the communication unit communicates with the RF tag by transmitting a Query-adjust command as the response request command in the calculation period subsequent to the calculation period in which it is determined that the communication state is good.

5. The RF tag reader and writer according to claim 1, wherein the communication process in the communication unit is performed in a plurality of the calculation periods, and
wherein the RF tag reader and writer further comprises a position determining unit that determines that a position of an antenna of the RF tag reader and writer is shifted when a determination result by the communication stability determining unit varies between the successive rounds.

6. The RF tag reader and writer according to claim 5, further comprising a grouping unit that groups the tag information acquired by the communication unit before the determination by the position determining unit and stores the grouped tag information in a predetermined memory area when the position determining unit determines that the position of the antenna of the RF tag reader and writer is shifted.

7. The RF tag reader and writer according to claim 6, wherein the grouping unit stores the grouped tag information in the predetermined memory area in correlation with information on the order of grouping and storage.

8. A tag information acquiring method comprising:

performing a communication process with an RF tag using a slot aloha method of performing the communication process with the RF tag as an information acquisition target at each of a plurality of time slots of a round, transmitting a response request command to the RF tag at each time slot, acquiring a response transmitted from the RF tag with an acquisition of the response request command, transmitting a tag information request command for requesting for transmitting tag information, which is information stored in the RF tag, to the RF tag having transmitted the acquired response, and acquiring the tag information transmitted from the RF tag with an acquisition of the tag information request command; and calculating a communication success rate $a_{ID}=n_{ID}/n_{ACK}$ with the RF tag on the basis of the number of times $n_{ACK}$ by which the tag information request command for requesting for transmitting the tag information, which is information stored in the RF tag, in the communication process of the communication unit with the RF tag in a calculation period including one or more rounds and the number of times $n_{ID}$ by which the tag information is received from the RF tag as a return to the tag information request command in the calculation period including one or more rounds;

acquiring received signal level information which is information indicating the magnitude of a signal transmitted from the RF tag;

acquiring signal level reference information, which is a reference for the magnitude of the received signal, stored in a predetermined memory area, determining whether the magnitude of the received signal transmitted from the RF tag is greater than the reference on the basis of a comparison result of the signal level reference information with the received signal level information for every time slot, and determining that a response is transmitted from the RF tag with the acquisition of the response request command transmitted from the communication unit at the time slot at which the magnitude of the received signal is greater than the reference;

calculating a response rate $a_{RN16}=n_{RN16}/n_{SL0}$ indicating a rate of the number of time slots at which the response is transmitted from the RF tag in the calculation period on the basis of the number of time slots $n_{RN16}$ at which it is determined that the response is transmitted in the calculation period and the number of time slots $n_{SL0}$ in the calculation period;

performing a communication state determining process of determining whether a communication state with the RF tag is good on the basis of a comparison result of communication success rate reference information, which is a reference for the communication success rate and is acquired from a predetermined memory area, with the communication success rate $a_{ID}$; and not performing the communication state determining process in the calculation period in which the response rate is 0.

* * * * *